(12) United States Patent
Yerramalli et al.

(10) Patent No.: US 11,582,618 B2
(45) Date of Patent: Feb. 14, 2023

(54) LISTEN-BEFORE-TALK BEAM OVERLAP MEASUREMENT PROCEDURES

(71) Applicant: QUALCOMM Incorporated, San Diego, CA (US)

(72) Inventors: Srinivas Yerramalli, San Diego, CA (US); Arumugam Chendamarai Kannan, San Diego, CA (US); Vinay Chande, San Diego, CA (US); Sony Akkarakaran, Poway, CA (US); Xiaoxia Zhang, San Diego, CA (US); Tao Luo, San Diego, CA (US); Sungwoo Park, San Diego, CA (US); Olufunmilola Omolade Awoniyi-Oteri, San Diego, CA (US); Mostafa Khoshnevisan, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 16/888,131

(22) Filed: May 29, 2020

(65) Prior Publication Data

US 2020/0413268 A1 Dec. 31, 2020

Related U.S. Application Data

(60) Provisional application No. 62/868,683, filed on Jun. 28, 2019.

(51) Int. Cl.
*H04W 16/28* (2009.01)
*H04W 72/04* (2009.01)
*H04W 56/00* (2009.01)
*H04W 74/08* (2009.01)

(52) U.S. Cl.
CPC ......... *H04W 16/28* (2013.01); *H04W 56/001* (2013.01); *H04W 72/046* (2013.01); *H04W 74/0808* (2013.01)

(58) Field of Classification Search
None
See application file for complete search history.

(56) References Cited

U.S. PATENT DOCUMENTS

2003/0161384 A1* 8/2003 Chun ................... H04B 7/0617
375/267
2017/0118774 A1* 4/2017 Cariou ............. H04W 74/0816
(Continued)

FOREIGN PATENT DOCUMENTS

| EP | 3668033 A1 | 6/2020 |
|---|---|---|
| WO | WO-2019031141 A1 | 2/2019 |
| WO | WO-2019031552 A1 | 2/2019 |

OTHER PUBLICATIONS

International Search Report and Written Opinion—PCT/US2020/035588—ISA/EPO—dated Sep. 7, 2020.
(Continued)

*Primary Examiner* — Gregory B Sefcheck
*Assistant Examiner* — Amarnauth G Persaud
(74) *Attorney, Agent, or Firm* — Holland & Hart LLP

(57) ABSTRACT

Methods, systems, and devices for wireless communications are described. A wireless device, such as a base station or a user equipment, may identify an energy detection threshold for a sensing beam associated with a channel access procedure, such as a listen-before-talk (LBT) procedure. The wireless device may also identify a set of transmit power parameters for one or more transmit beams. The wireless device may determine a degree of overlap between a coverage area of one or more transmit beams and a coverage area of the sensing beam. The wireless device may adjust the set of transmit power parameters, the energy detection
(Continued)

threshold, or a combination thereof based on the degree of overlap. The wireless device may perform the channel access procedure based on the determining, the adjusting, or both.

28 Claims, 18 Drawing Sheets

(56) References Cited

U.S. PATENT DOCUMENTS

| | | | |
|---|---|---|---|
| 2019/0104542 A1* | 4/2019 | Chendamarai Kannan | ............... H04W 74/0808 |
| 2019/0200389 A1* | 6/2019 | Li | ............... H04W 72/0453 |
| 2020/0245356 A1* | 7/2020 | Tomeba | ............ H04W 72/0453 |
| 2021/0298072 A1* | 9/2021 | Oh | ................... H04W 72/0446 |

OTHER PUBLICATIONS

ZTE: "Discussion on Channel Access Mechanism for NR-U", 3GPP Draft, R1-1812435, Discussion on Channel Access Mechanism for NR-U Final, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12-Nov. 16, 2018, Nov. 11, 2018 (Nov. 11, 2018), XP051554350, 7 Pages, Retrieved from the Internet: URL: http://www.3gpp.org/ftp/Meetings%5F3GPP%5FSYNC/RAN1/Docs/R1%2D1812435%2Ezip. [retrieved on Nov. 11, 2018] the whole document.

* cited by examiner

LISTEN-BEFORE-TALK BEAM OVERLAP MEASUREMENT PROCEDURES

CROSS REFERENCE

The present application for patent claims the benefit of U.S. Provisional Patent Application No. 62/868,683 by YERRAMALLI et al., entitled "LISTEN-BEFORE-TALK BEAM OVERLAP MEASUREMENT PROCEDURES," filed Jun. 28, 2019, assigned to the assignee hereof, and expressly incorporated by reference herein.

BACKGROUND

The following relates generally to wireless communications, and more specifically to listen-before-talk procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems (e.g., NR systems) may operate in a shared radio frequency spectrum. In some cases, it may be appropriate for a wireless device (e.g., base station or UE) to transmit or receive signals (e.g., reference signals, control signals, or data signals) using one or more beams in a shared radio frequency spectrum. The shared radio frequency spectrum may be a spectrum that is unlicensed, licensed to multiple operators, or licensed to a single operator. Conventional techniques for supporting communications using beams in a shared radio frequency spectrum may be deficient.

SUMMARY

Generally, the described techniques provide various mechanisms that support aligning a sensing beam with a transmission beam during a channel access procedure. Aspects of the described techniques may include a wireless device, such as a base station or a user equipment (UE), determining whether the overlap between the sensing beam (e.g., the receive beam used during a channel access procedure, such as a listen-before-talk (LBT) procedure) and the transmit beam satisfies a threshold and, if not, adjusting one or both of the beams to improve the coverage area overlap. The wireless device may identify or otherwise determine a coverage area for the sensing beam based, at least in some aspects, on an energy detection threshold of an LBT procedure. That is, the wireless device may identify the energy detection threshold used for the sensing beam during the LBT procedure to determine, at least in some aspects, the coverage area of the sensing beam (e.g., a first coverage area). Similarly, the wireless device may identify or otherwise determine a coverage area for a transmit beam being used for wireless transmissions based on the LBT procedure, e.g., the wireless transmission occurring during a transmission opportunity/channel occupancy time based on a successful LBT procedure. This may include the wireless device identifying a set of transmit power parameters for the transmit beam, e.g., the transmission power, effective isotropic radiated power (EIRP), and the like.

The wireless device may identify or otherwise determine the degree of overlap between the coverage area of the sensing beam (e.g., the first coverage area) and the coverage area of the transmit beam (e.g., the second coverage area). If the degree of overlap is within a threshold, the wireless device may perform the LBT procedure and, if successful, perform the wireless transmission using the transmit beam. If the degree of overlap is not within the threshold, the wireless device may adjust a set of transmit power parameters for the transmit beam and/or the energy detection threshold of the sensing beam. That is, the wireless device may adjust the set of transmit power parameters and/or the energy detection threshold such that the degree of overlap between the transmit beam and the sensing beam are within the threshold. Then the wireless device may perform the LBT procedure and, based on a successful result of the LBT procedure, perform the wireless transmission using the adjusted sensing beam and/or transmit beam.

A method of wireless communication at a wireless device is described. The method may include identifying an energy detection threshold for a sensing beam associated with a channel access procedure; identifying a set of transmit power parameters for a transmit beam used for performing wireless transmissions associated with the channel access procedure; adjusting the set of transmit power parameters, the energy detection threshold, or both, based on a degree of overlap between a coverage area of the transmit beam and a coverage area of the sensing beam; and performing the channel access procedure based on the adjusting.

An apparatus for wireless communication at a wireless device is described. The apparatus may include a processor, memory coupled with the processor, and instructions stored in the memory. The instructions may be executable by the processor to cause the apparatus to identify an energy detection threshold for a sensing beam associated with a channel access procedure; identify a set of transmit power parameters for a transmit beam used for performing wireless transmissions associated with the channel access procedure; adjust the set of transmit power parameters, the energy detection threshold, or both, based on a degree of overlap between a coverage area of the transmit beam and a coverage area of the sensing beam; and perform the channel access procedure based on the adjusting.

Another apparatus for wireless communication at a wireless device is described. The apparatus may include means for identifying an energy detection threshold for a sensing beam associated with a channel access procedure; identifying a set of transmit power parameters for a transmit beam used for performing wireless transmissions associated with the channel access procedure; adjusting the set of transmit power parameters, the energy detection threshold, or both, based on a degree of overlap between a coverage area of the transmit beam and a coverage area of the sensing beam; and performing the channel access procedure based on the adjusting.

A non-transitory computer-readable medium storing code for wireless communication at a wireless device is described. The code may include instructions executable by a processor to identify an energy detection threshold for a sensing beam associated with a channel access procedure; identify a set of transmit power parameters for a transmit beam used for performing wireless transmissions associated with the channel access procedure; adjust the set of transmit power parameters, the energy detection threshold, or both, based on a degree of overlap between a coverage area of the transmit beam and a coverage area of the sensing beam; and perform the channel access procedure based on the adjusting.

Some examples of the method, apparatuses, and non-transitory computer-readable medium described herein may further include operations, features, means, or instructions for modifying the coverage area of the transmit beam to increase the degree of overlap based on adjusting the set of transmit power parameters.

In some examples of the method, apparatuses, and non-transitory computer-readable medium described herein, modifying the coverage area of the transmit beam further may include operations, features, means, or instructions for decreasing the coverage area of the transmit beam based on decreasing one or more values of the set of transmit power parameters.

Some examples of the method, apparatuses, and non-transitory computer-readable medium described herein may further include operations, features, means, or instructions for modifying the coverage area of the sensing beam to increase the degree of overlap based on adjusting the energy detection threshold.

In some examples of the method, apparatuses, and non-transitory computer-readable medium described herein, modifying the coverage area of the sensing beam further may include operations, features, means, or instructions for increasing the coverage area of the sensing beam based on decreasing the energy detection threshold.

Some examples of the method, apparatuses, and non-transitory computer-readable medium described herein may further include operations, features, means, or instructions for determining a set of channel sensing parameters associated with the sensing beam based on a transmission opportunity associated with the transmit beam, and selecting a beam pattern for the sensing beam based on the set of channel sensing parameters.

In some examples of the method, apparatuses, and non-transitory computer-readable medium described herein, the set of channel sensing parameters includes an antenna element, a set of antenna elements, an antenna element combination scheme, a channel type of the transmission opportunity, or a combination thereof.

Some examples of the method, apparatuses, and non-transitory computer-readable medium described herein may further include operations, features, means, or instructions for identifying the coverage area of the sensing beam and the coverage area of the transmit beam, and determining that the degree of overlap between the coverage area of the sensing beam and the coverage area of the transmit beam fails to satisfy an overlap threshold.

In some examples of the method, apparatuses, and non-transitory computer-readable medium described herein, the overlap threshold includes a difference between a gain for one or more angles of the transmit beam and a gain for one or more angles of the receive beam.

Some examples of the method, apparatuses, and non-transitory computer-readable medium described herein may further include operations, features, means, or instructions for identifying a second set of transmit power parameters for a second transmit beam used for performing wireless transmissions associated with the channel access procedure, and adjusting the set of transmit power parameters, the second set of transmit power parameters, the energy detection threshold, or a combination thereof, based on a degree of overlap between the coverage area of the transmit beam, a coverage area of the second transmit beam, and the coverage area of the sensing beam.

Some examples of the method, apparatuses, and non-transitory computer-readable medium described herein may further include operations, features, means, or instructions for determining that the second transmit beam may be transmitted on different time resources than the transmit beam, identifying an adjustment for the second set of transmit power parameters, and modifying the coverage area of the second transmit beam to increase a degree of overlap between the second transmit beam and the receive beam based on the identified adjustment.

Some examples of the method, apparatuses, and non-transitory computer-readable medium described herein may further include operations, features, means, or instructions for determining that the second transmit beam may be transmitted concurrently with the transmit beam, identifying an adjustment for the set of transmit power parameters and an adjustment for the second set of transmit power parameters, comparing the adjustment for the set of transmit power parameters with the adjustment for the second set of transmit power parameters, and modifying the coverage area of the transmit beam and the coverage area of the second transmit beam using the larger adjustment.

In some examples of the method, apparatuses, and non-transitory computer-readable medium described herein, the sensing beam includes a directional sensing beam.

In some examples of the method, apparatuses, and non-transitory computer-readable medium described herein, the set of transmit power parameters includes a transmission power of the transmit beam, an EIRP of the transmit beam, or a combination thereof.

In some examples of the method, apparatuses, and non-transitory computer-readable medium described herein, the transmit beam includes a signal synchronization block (SSB), a data channel, a control channel, a reference signal, a beam of a beam sweeping procedure, or any combination thereof.

A method of wireless communication at a wireless device is described. The method may include identifying a second coverage area for a transmit beam used for performing wireless transmissions associated with a channel access procedure, the second coverage area based on a set of transmit power parameters of the transmit beam, determining whether a degree of overlap between the second coverage area and a first coverage area for a sensing beam associated with the channel access procedure is within a threshold, and performing the channel access procedure based on the determining.

An apparatus for wireless communication at a wireless device is described. The apparatus may include a processor, memory coupled with the processor, and instructions stored in the memory. The instructions may be executable by the processor to cause the apparatus to identify a second coverage area for a transmit beam used for performing wireless transmissions associated with a channel access procedure, the second coverage area based on a set of transmit power parameters of the transmit beam, determine whether a degree of overlap between the second coverage area and a first coverage area for a sensing beam associated with the channel access procedure is within a threshold, and perform the channel access procedure based on the determining.

Another apparatus for wireless communication at a wireless device is described. The apparatus may include means for identifying a second coverage area for a transmit beam used for performing wireless transmissions associated with a channel access procedure, the second coverage area based on a set of transmit power parameters of the transmit beam, determining whether a degree of overlap between the second coverage area and a first coverage area for a sensing beam associated with the channel access procedure is within a threshold, and performing the channel access procedure based on the determining.

A non-transitory computer-readable medium storing code for wireless communication at a wireless device is described. The code may include instructions executable by a processor to identify a second coverage area for a transmit beam used for performing wireless transmissions associated with a channel access procedure, the second coverage area based on a set of transmit power parameters of the transmit beam, determine whether a degree of overlap between the second coverage area and a first coverage area for a sensing beam associated with the channel access procedure is within a threshold, and perform the channel access procedure based on the determining.

In some examples of the method, apparatuses, and non-transitory computer-readable medium described herein, determining whether the degree of overlap may be within the threshold may include operations, features, means, or instructions for determining, for all available transmission angles of the transmit beam, that the first coverage area overlaps all of the second coverage area within the threshold.

In some examples of the method, apparatuses, and non-transitory computer-readable medium described herein, determining whether the degree of overlap may be within the threshold may include operations, features, means, or instructions for identifying, for all available transmission angles of the transmit beam, a probability metric associated with the degree of overlap between the first coverage area and the second coverage area, and determining that the probability metric may be within the threshold based on the probability metric being within the threshold.

Some examples of the method, apparatuses, and non-transitory computer-readable medium described herein may further include operations, features, means, or instructions for identifying the first coverage area for the sensing beam based on an energy detection threshold associated with the channel access procedure.

In some examples of the method, apparatuses, and non-transitory computer-readable medium described herein, determining whether the degree of overlap may be within the threshold may include operations, features, means, or instructions for identifying a maximum transmission power for a first set of transmission angles of the transmit beam, identifying a subset of transmission angles for the transmit beam, each transmission angle in the subset of transmission angles including a transmission power within a threshold value of the maximum transmission angle, and determining that the coverage areas of the transmit beam for each transmission angle in the subset of transmission angles may be within the threshold.

In some examples of the method, apparatuses, and non-transitory computer-readable medium described herein, determining whether the degree of overlap may be within the threshold may include operations, features, means, or instructions for calculating, for each transmission angle within a set of transmission angles of the transmit beam, a difference in gain between the transmit beam and the sensing beam, and identifying a subset of transmission angles for the transmit beam in which the difference in gain may be within the threshold.

In some examples of the method, apparatuses, and non-transitory computer-readable medium described herein, the sensing beam includes a directional sensing beam.

In some examples of the method, apparatuses, and non-transitory computer-readable medium described herein, the set of transmit power parameters includes a transmission power of the transmit beam, an EIRP of the transmit beam, or a combination thereof.

In some examples of the method, apparatuses, and non-transitory computer-readable medium described herein, the wireless device is a UE, a base station, or a relay node.

In some examples of the method, apparatuses, and non-transitory computer-readable medium described herein, the transmit beam includes an SSB, a data channel, a control channel, a reference signal, a beam of a beam sweeping procedure, or any combination thereof.

In some examples of the method, apparatuses, and non-transitory computer-readable medium described herein, the wireless device comprises a plurality of antenna elements, each antenna element of the plurality of antenna elements configured to perform the channel access procedure.

DETAILED DESCRIPTION

Figure 1:
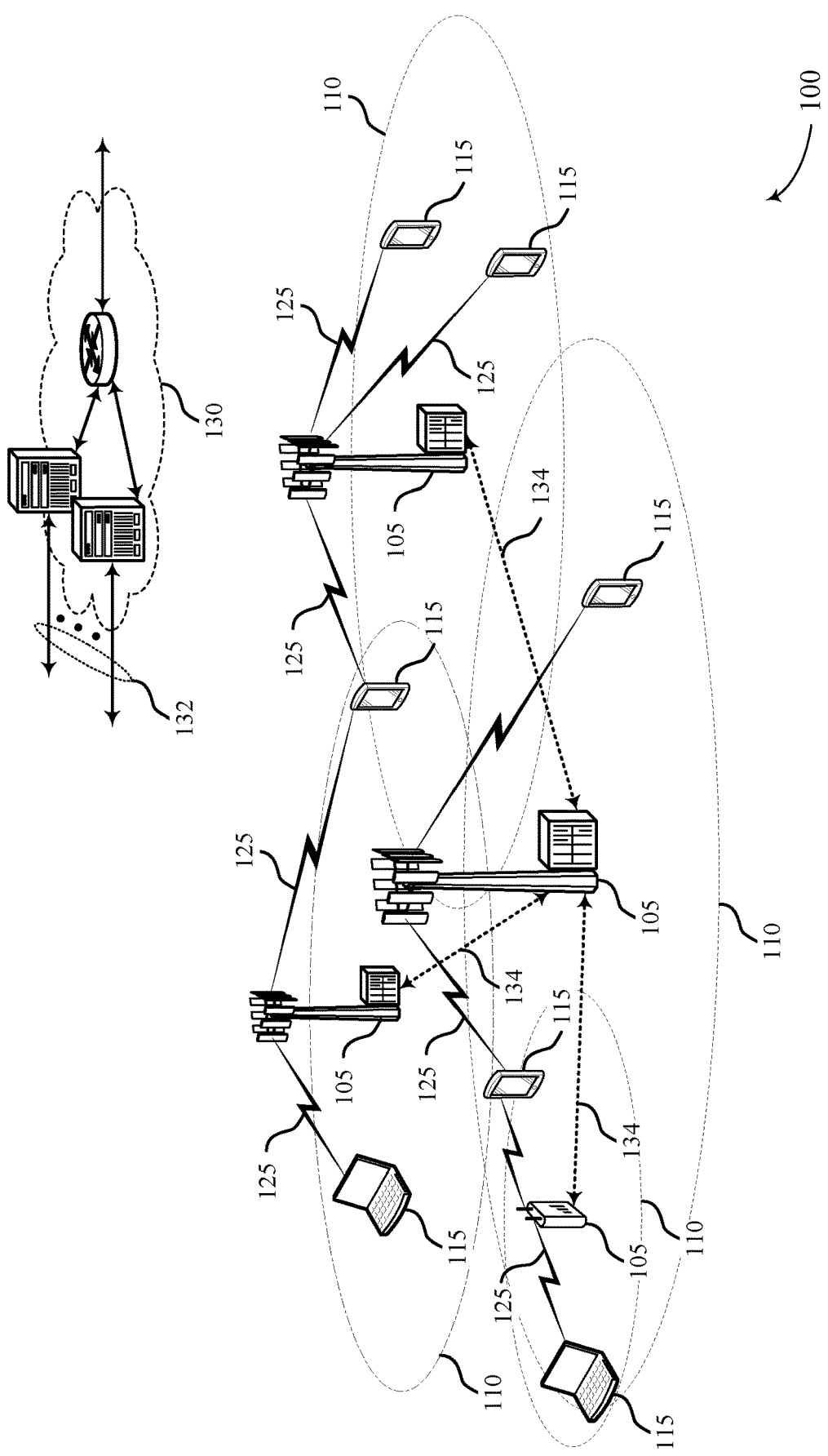
FIG. 1-6 illustrate examples of systems for wireless communications that supports listen-before-talk procedures in accordance with aspects of the present disclosure.

Some wireless communications systems may use signal processing techniques, such as beamforming. For example, wireless communication systems may operate in one or more frequency ranges, such as millimeter wave (mmW) frequency ranges (e.g., 28 GHz, 40 GHz, 60 GHz, etc.), WiFi frequency ranges (e.g., 5 & 6 GHz), among other frequency ranges (e.g., between 7 GHz and 24 GHz). In some cases, wireless communications at these or other frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Thus, transmissions from the base station and/or the UE may be beamformed. Moreover, a receiving device may use beamforming techniques to configure antenna(s) and/or antenna array(s) such that transmissions are received in a directional manner.

Wireless communication systems may also operate in a shared or unlicensed radio frequency spectrum band. Operations in a shared or unlicensed radio frequency band may require the wireless devices to perform interference management procedures. For example, the wireless devices may perform a channel access procedure, which may also be referred to as a listen-before-talk (LBT) procedure, a clear channel assessment (CCA) procedure, and the like. Generally, the LBT procedure may include the wireless device monitoring the channel for a time period (e.g., that depends on whether the LBT procedure is a one-shot LBT procedure, a full LBT procedure, and the like) to determine whether the channel is occupied or available for capture. Based on various channel sensing parameters of the LBT procedure, the wireless device may monitor the channel for energy and/or waveforms to capture the channel. However, wireless devices that operate in a mmW frequency range and in an unlicensed or shared radio frequency spectrum band requiring an LBT procedure may experience difficulties. For example, conventional techniques may not provide a mechanism for the wireless device to ensure or otherwise confirm that the sensing beam used in the LBT procedure overlaps with, at least to some degree, the transmit beam used for performing the wireless transmission. In such cases, the sensing beam may not accurately reflect the channel conditions in the direction or coverage area of the transmit beam.

Additionally, aspects of wireless communications systems may result in technical challenges for implementing directional sensing beams. As an example, new radio (NR) systems may include rapidly changing and dynamic beam conditions (e.g., different channels may be transmitted using different beams or beam patterns, beam sweeping procedures may rely on sensing before transmitting multiple independent beams in the same time resources, etc.), as well as a large amount of beam diversity for a wireless device to account for when communicating. For example, the wireless device may have multiple independent transmit beams for communications in multiple directions (e.g., associated with a channel state information (CSI) codebook, synchronization signal blocks (SSBs), common and UE-specific control information, etc.). In a shared or unlicensed spectrum, the wireless device may determine to use a directional sensing beam, e.g., to capture the channel for communications. However, the directional sensing beam may not sufficiently cover one or more of the transmit beams, which may result in inaccurate channel sensing.

Aspects of the disclosure are initially described in the context of a wireless communications system, such as a mmW wireless network. Aspects of the described techniques may include a wireless device, such as a base station or a UE, determining whether the overlap between the sensing beam and the transmit beam satisfies a threshold and, if not, adjusting one or both of the beams such that the coverage area overlap satisfies the threshold (e.g., such that the transmit beam is within a coverage area of the sensing beam). For example, the wireless device may identify or otherwise determine a coverage area for a sensing beam based, at least in some aspects, on an energy detection threshold of an LBT procedure. That is, the wireless device may identify the energy detection threshold used for the sensing beam during the LBT procedure to determine, at least in some aspects, the coverage area of the sensing beam (e.g., a first coverage area). Similarly, the wireless device may identify or otherwise determine a coverage area for a transmit beam being used for wireless transmissions based on the LBT procedure. This may include the wireless device identifying a set of transmit power parameters for the transmit beam, e.g., the transmission power, effective isotropic radiated power (EIRP), and the like.

The wireless device may identify or otherwise determine the degree of overlap between the coverage area of the sensing beam (e.g., the first coverage area) and the coverage area of the transmit beam (e.g., the second coverage area). If the degree of overlap is within a threshold, the wireless device may perform the LBT procedure and, if successful, perform the wireless transmission using the transmit beam. If the degree of overlap is not within the threshold, the wireless device may adjust a set of transmit power parameters for the transmit beam and/or the energy detection threshold of the sensing beam. That is, the wireless device may adjust the set of transmit power parameters and/or the energy detection threshold such that the degree of overlap between the transmit beam and the sensing beam are within the threshold. Then the wireless device may perform the LBT procedure and, based on a successful result of the LBT procedure, perform the wireless transmission using the adjusted sensing beam and/or transmit beam.

Aspects of the disclosure are initially described in the context of wireless communications systems. Aspects of the disclosure are further illustrated by and described with reference to apparatus diagrams, system diagrams, and flowcharts that relate to listen-before-talk procedures.

FIG. 1 illustrates an example of a wireless communications system 100 that supports listen-before-talk procedures in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a relay node, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services. The operators IP services may include access to the Internet, Intranet(s), an IP Multimedia Subsystem (IMS), or a Packet-Switched Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, spatial division multiplexing (SDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a wireless device (e.g., a base station 105 and/or a UE 115) may identify a first coverage area for a sensing beam based at least in part on an energy detection threshold associated with an LBT procedure. The wireless device may identify a second coverage area for a transmit beam used for performing wireless transmissions associated with the LBT procedure, the second coverage area based at least in part on a set of transmit power parameters of the transmit beam. The wireless device may determine whether a degree of overlap between the second coverage area and the first coverage area is within a threshold. In some examples, the wireless device may adjust the first coverage area, the second coverage area, or both based on the determining. Additionally or alternatively, the wireless device may perform the LBT procedure based at least in part on the determining.

Figure 2:
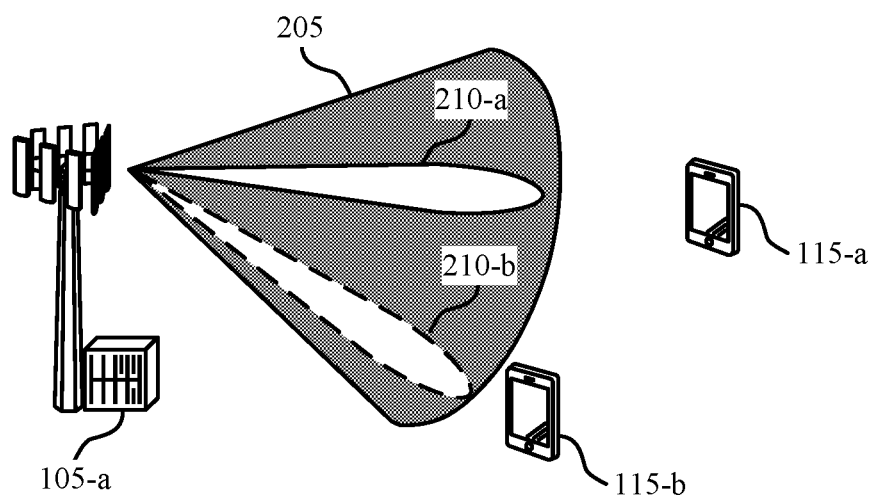

FIG. 2 illustrates an example of a wireless communication system 200 that supports listen-before-talk procedures in accordance with aspects of the present disclosure. may implement aspects of wireless communication system 100. Aspects of wireless communication system 200 may be implemented by base station 105-*a*, UE 115-*a*, and/or a UE 115-*b*, which may be examples of the corresponding devices described herein. In some aspects, any of base station 105-*a*, UE 115-*a*, and/or a UE 115-*b* may be examples of a wireless device, as described herein. Accordingly, references to a wireless device may refer to any of base station 105-*a*, UE 115-*a*, and/or UE 115-*b*.

In some aspects, wireless communication system 200 may be or include a wireless network (e.g., a mmW network) operating in a shared or unlicensed radio frequency spectrum band. For example, base station 105-*a*, UE 115-*a*, and/or a UE 115-*b* may perform wireless communications using beamformed transmissions/receptions. Base station 105-*a* may perform a wireless transmission to UE 115-*a* using a transmit beam 210-*a* and perform a wireless transmission to UE 115-*b* using a transmit beam 210-*b*. The wireless devices may use an active transmit beam 210 for performing a wireless transmission and/or use an active receive beam for receiving a wireless transmission in a directional manner. Generally each active beam may have its own corresponding set of parameters that are configured to provide the wireless transmission in the directional manner. For example, transmit beam 210 may have a corresponding set of transmit power parameters including a transmission power of the transmit beam, an effective isotropic radiated power (EIRP), and the like. Generally, the set of transmit power parameters may be used to configure the transmit beam 210 for transmission, e.g., may define the coverage area or footprint of the transmit beam.

The wireless devices may perform a channel access procedure such as an LBT procedure to capture the channel for the wireless transmission. The LBT procedure or similar channel access procedures may support channel sharing between wireless devices. The LBT procedure (or channel access procedure) performed by the initiating wireless device may include energy sensing and/or waveform detection to determine whether the medium is busy or available. Conventionally, such energy sensing/waveform detection is performed in an omni-directional manner (e.g., omni-sensing) either non-coherently or coherently. The non-coherent sensing may use combining. For example, energy sensing may include summing the energy from each antenna port, e.g., from each sensing unit, antenna element(s), and the like. As another example, waveform detection may include the wireless device independently detecting the waveform from each antenna port, and then determining if one or more of the antenna ports detected the preamble (e.g., a wireless transmission on the channel).

Coherent sensing may combine the antenna elements inputs to create a pseudo-omni beam (e.g., with the antenna array gain being much smaller than the number of antenna elements) to capture energy/waveform(s) from a wide range of directions. The energy/waveform detection may be performed on the combined output of the antenna elements inputs. An alternative approach to coherent energy sensing/waveform detection may include coherently combining the antenna element's inputs to create a highly directional beam with high array gain for sensing. For example, the initiating wireless device may have multiple transmit/receive panels/sensing units. In some aspects, only one (or a subset) of the panels/sensing units may be active at a given point in time for a given transmission opportunity.

For beam-based transmissions and when an LBT procedure is used for the transmission, the channel sensing beam 205 used for the LBT procedure may be expected to match the transmit beam 210 used for the wireless transmission. In some aspects, the sensing beam 205 may be a directional sensing beam. Broadly, the sensing beam 205 footprint (e.g., the coverage area of the received beam used during the LBT procedure) may be determined based on the energy detection threshold in order to match the transmit beam 210 footprint (or coverage area) as defined by the EIRP, for example. As one non-limiting example, the sensing beam 205 may be a B1 beam and the transmit beam 210 may be a B2 beam, where B1 and B2 beams are different. As another non-limiting example, a wide beam (e.g., a B0 beam) may be used as the sensing beam 205 and a narrow beam (e.g., a B1, B2, or B3 beam, and with beam sweeping in some scenarios) may be used as transmit beam 210 to transmit the preamble and data. However, conventional techniques do not provide any guidelines with respect to which beam can be used as a sensing beam 205 and/or which beam can be used as transmit beam 210 given a particular sensing beam 205. For example, conventional techniques may not prohibit a sensing beam 205 being oriented in an opposite direction as the transmit beam 210. In such cases, a sensing beam 205 may not accurately reflect the channel conditions of the coverage area for a transmit beam 210. For example, if the coverage area of the transmit beam 210 is outside the coverage area of the sensing beam 205, then the sensing beam 205 may fail to detect potential interfering communications occurring outside of its coverage area. This may result in a loss of communications between the wireless devices or may result in interference and other inefficiencies across the communications network.

Accordingly, aspects of the described techniques provide varying mechanisms addressing the sensing beam 205 and transmit beam 210 overlap, at least to some degree. Generally, this may include a wireless device either dynamically or semi-statically choosing, for each transmission opportunity, the beam pattern that it uses for channel sensing (e.g., for sensing beam 205). Some factors the wireless device may consider include, but are not limited to, the number of antenna elements, analog or digital combining, the beam pattern, the type of physical channel/reference signal, and the like. The wireless device may use a subset of antenna elements to generate a sensing beam 205 (or multiple independent sensing beams 205, in some examples). The example where multiple independent sensing beams 205 are generated may include a transmission using a type-II CSI codebook. The wireless device may further combine the output of several antenna ports digitally with different phase shift sets to compute the energy in different directions.

In some aspects, different beam patterns may be generated from a given set of antenna elements. Different beams may be used based on the type of physical channel or reference signal. For example, different beams may be used for an SSB, a physical downlink control channel (PDCCH), a physical downlink shared channel (PDSCH), a channel state information reference signal (CSI-RS), a tracking reference signal (TRS), a position tracking reference signal (PTRS), a sounding reference signal (SRS), a physical uplink shared channel (PUSCH), a physical uplink control channel (PUCCH), a physical random access channel (PRACH), a sidelink channel, a positioning reference signal (PRS), a cellular vehicle to everything (CV2X) channel, and the like. For SSBs, PRACH, and/or CSI-RS, the beams may conventionally be semi-statically determined. For control and data channels, the beam patterns may conventionally be determined dynamically based on receiver feedback (e.g., UE SRS, CSI feedback, etc.). A wireless device with multiple sensing units may perform an LBT procedure independently per sensing unit, e.g., under the constraint of a half-duplex operation.

Accordingly, a wireless device may identify the coverage area (e.g., a first coverage area) for sensing beam 205 based, at least in some aspects, on an energy detection threshold associated with the LBT procedure. That is, the wireless device may identify an energy detection threshold for sensing beam 205 associated with the LBT procedure. The wireless device may also identify the coverage area (e.g., a second coverage area) for a transmit beam 210 used for performing wireless transmissions associated with the LBT procedure. The coverage area of the transmit beam 210 may be based, at least in some aspects, on a set of transmit power parameters of the transmit beam 210. For example, the wireless device may identify the set of transmit power parameters for transmit beam 210 used for performing the wireless transmissions associated with the LBT procedure.

The wireless device may determine whether the degree of overlap between the coverage area of the transmit beam 210 (e.g., the second coverage area) and the coverage area of the sensing beam 205 (e.g., the first coverage area) is within a threshold. In one non-limiting example, this may include using a B0 wide beam as sensing beam 205 and performing wireless transmissions with B1, B2, B3, etc., beams as transmit beams 210 such that the coverage area of the transmit beam 210 is within the coverage area of the sensing beam 205.

In some aspects, the threshold may be a stringent threshold requiring complete overlap of the coverage area of the transmit beam 210 within the coverage area of the sensing beam 205. For example, the wireless device may determine whether the array gain plus the antenna gain of the transmit beam 210 is smaller than the array gain of the sensing beam 205 in all angles (e.g., azimuth/elevation). In this example, the sensing beam 205 may be paired with an appropriate energy detection threshold and the transmit beam 210 may be paired with an appropriate EIRP to ensure complete overlap. Mathematically, this may be illustrated as $A_{TX}(\theta, \emptyset) \leq A_{RX}(\theta, \emptyset)$ for all $\theta$ and $\emptyset$ (e.g., for all angles), where A is the antenna gain plus the array gain in a given direction. $A_{RX}$ may refer to the sensing beam 205, e.g., the sensing beam 205 may generally refer to a receive beam configuration used by the wireless device during the LBT procedure. In some aspects, this stringent threshold requirement may be strict, and it may be difficult to achieve for all angles (e.g., side lobes, etc.). Accordingly, the wireless device may determine, for all available transmission angles of the transmit beam 210, that the coverage area of the sensing beam 205 overlaps all of the coverage area of the transmit beam 210, e.g., is within the threshold.

In some aspects, the threshold may be satisfied probabilistically. Mathematically, this may be illustrated as $P[A_{TX}(\theta,\emptyset) \leq A_{RX}(\theta,\emptyset)] > p$ (e.g., 0.95), where p is the probability metric and the probability metric is computed over all available angles, e.g., for all $\theta$ and $\emptyset$. Accordingly, the wireless device may identify, for all available transmission angles of transmit beam 210, a probability metric associated with the degree of overlap between the coverage area of the sensing beam 205 and the coverage area of the transmit beam 210. The wireless device may determine that the degree of overlap (e.g., the probability metric) is within the threshold based, at least in some aspects, on the identified probability metric being within the threshold.

In some aspects, the threshold may be satisfied only for transmission angles that are most relevant for a particular transmission or transmit beam 210. Mathematically, this may be illustrated as $A_{TX}(\theta,\emptyset) \leq A_{RX}(\theta,\emptyset)$ for angles $\theta,\emptyset$ such that $A_{TX}(\theta,\emptyset)/A_{Max} > \alpha$ (e.g., 20 dB), where $A_{Max}$ is the direction with the maximum array gain (e.g., EIRP). Accordingly, the wireless device may identify the maximum transmission power for a first set of transmission angles of the transmit beam 210. The wireless device may identify a subset of transmission angles for the transmit beam 210, with each transmission angle in the subset of transmission angles including a transmission power within a threshold value of the maximum transmission angle. The wireless device may determine that the coverage areas of the transmit beam 210 for each transmission angle in the subset of transmission angles is within the threshold.

In some aspects, the threshold may be satisfied with a change in the energy detection threshold and/or a change in the EIRP (e.g., the energy detection threshold and/or the EIRP or other transmit power parameters may vary within a range). Mathematically, this may be illustrated as $P[A_{TX}(\theta,\emptyset) - \Delta_{EIRP} \leq A_{RX}(\theta,\emptyset) + \Delta_{ED}] > p$ (e.g., 0.95) for the most relevant angles. The energy detection (ED) threshold on sensing beam 205 can be changed and/or the EIRP of transmit beam 210 may be reduced/increased so that the criteria are satisfied (e.g., the threshold is satisfied) in the situation where the beam shapes are mismatched. In some examples, the change in the energy detection threshold and/or the change in the EIRP may be a function of the angles $\theta$ and $\emptyset$. Additionally or alternatively, the threshold may be a function of the angles $\theta$ and $\emptyset$. Accordingly, the wireless device may calculate, for each transmission angle within a set of transmission angles of the transmit beam 210, a difference in gain between the transmit beam 210 and the sensing beam 205. The wireless device may identify a subset of transmission angles for the transmit beam 210 in which the difference is gain is within the threshold (e.g., is within p).

In some examples of the techniques described above, determining whether the threshold is satisfied may include a weighting distribution. For example, for the probability computation, each angle may include a weight factor influencing the probability computation (e.g., so that more relevant angles are given more weight for the calculation). Such a weighting distribution may enable a wireless device to probabilistically determine whether the overlap satisfies the threshold based on some angles being more relevant than others.

In the situation where the degree of overlap between the coverage areas of the transmit beam 210 and the sensing beam 205 are within the threshold, the wireless device may then perform the LBT procedure and associated transmission using the adjusted transmit beam 210 and/or sensing beam 205. In the situation where the degree of overlap between the coverage areas of the transmit beam 210 and the sensing beam 205 are not within the threshold, the wireless device may adjust the set of transmit power parameters and/or the energy detection threshold based, at least in some aspects, on the degree of overlap between the coverage area of the transmit beam 210 and the coverage area of the sensing being 205.

In some examples, the wireless device may adjust one or more parameters of the sensing beam 205, the transmission beam 210-*a*, the transmission beam 210-*b*, or any combination thereof. For example, the wireless device may determine that the coverage area of one or more transmission beams 210 (e.g., transmission beam 210-*a*, transmission beam 210-*b*, or both) and the coverage area of the sensing beam 205 do not satisfy an overlap threshold (e.g., the coverage area of the transmission beams 210 extends past the coverage area of sensing beam 205). In some cases, the wireless device may perform one or more adjustments to the transmission beams 210. For example, the wireless device may adjust one or more transmit power parameters (e.g., transmission power, EIRP, and the like) of the transmission beams 210. Additionally or alternatively, the wireless device may adjust one or more parameters of the sensing beam 205 (e.g., an energy detection threshold). Such adjustments may result in a new coverage area of the transmission beams 210, the sensing beam 205, or a combination thereof. The new coverage areas may satisfy the overlap threshold, for example, such that footprints or coverage areas of the transmission beams 210 are contained within the footprint or coverage area of the sensing beam 205. Accordingly, the wireless device may perform an LBT procedure using the adjusted beams.

As discussed, wireless communication system 200 may operate in a shared or unlicensed radio frequency spectrum band. However, it is to be understood that the described techniques are not limited to a shared or unlicensed radio frequency spectrum band. Instead, the described techniques may be implemented in a licensed radio frequency spectrum band, such as in a scenario where multiple operators coexist within wireless communication system 200. Moreover, the described techniques may be implemented in any frequency range, e.g., frequency range one (FR1), frequency range 2 (FR2), frequency range 3 (FR3), frequency range four (FR4), frequency range 5 (FR5), and so on.

Figure 3:
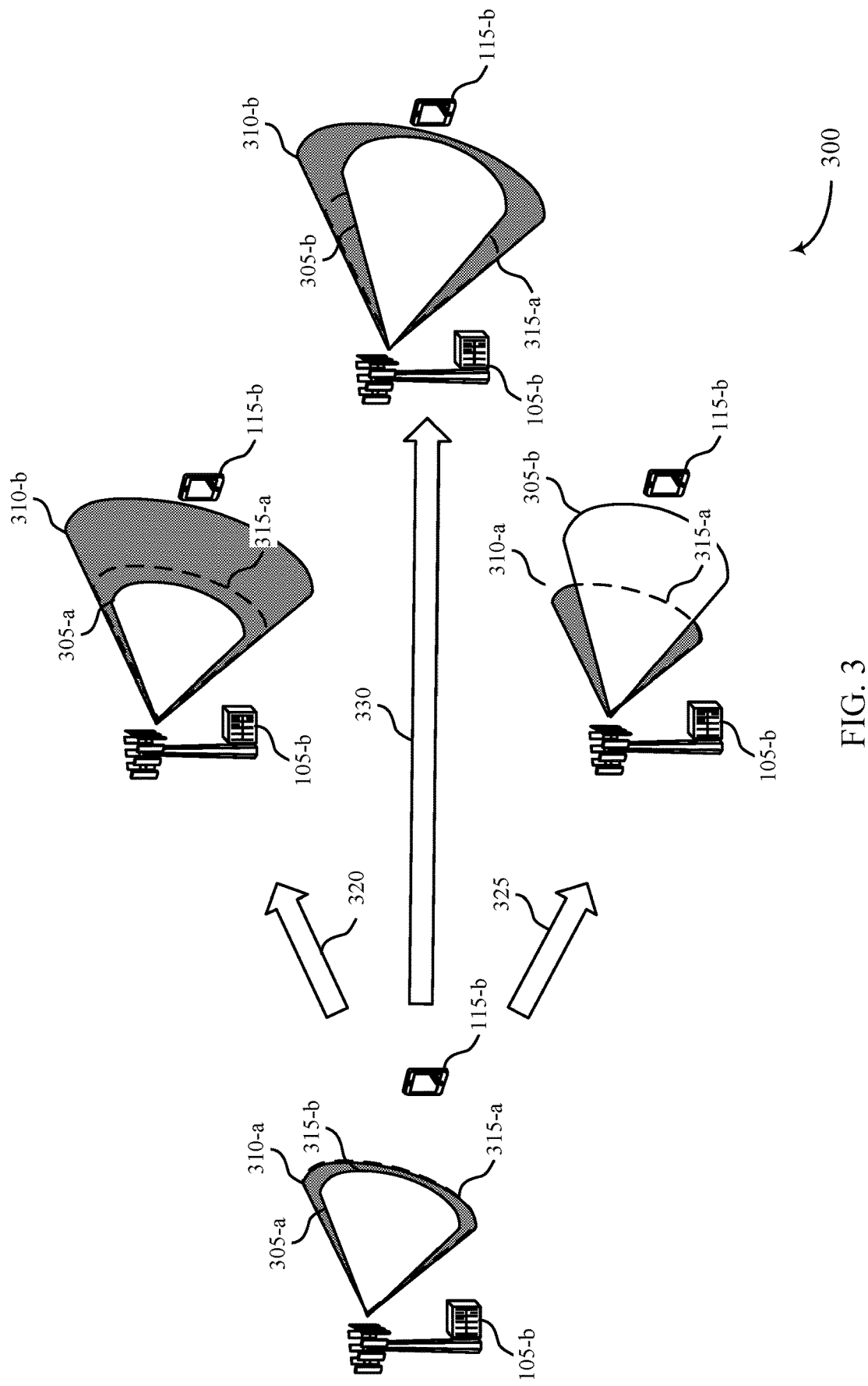

FIG. 3 illustrates an example of a wireless communications system 300 that supports listen-before-talk procedures in accordance with aspects of the present disclosure. In some examples, wireless communications system 300 may implement aspects of wireless communication systems 100 and/or 200. Aspects of wireless communication system 300 may be implemented by base station 105-b and/or UE 115-b, which may be examples of the corresponding devices described herein. In some aspects, any of base station 105-b and/or a UE 115-b may be examples of a wireless device, as described herein. Accordingly, references to a wireless device may refer to any of base station 105-b and/or UE 115-b. Generally, FIG. 3 may illustrate an example of a wireless device adjusting one or more parameters of a transmit beam 305, a sensing beam 310, or both.

In some aspects, wireless communication system 300 may be or may include a mmW network operating in a shared or unlicensed radio frequency spectrum band. For example, base station 105-b and/or a UE 115-b may perform wireless communications using beamformed transmissions/receptions. Base station 105-b may perform a wireless transmission to UE 115-b using a transmit beam 305-a. Generally transmit beam 305-a may have its own corresponding set of parameters that are configured to provide the wireless transmission in the directional manner. For example, transmit beam 305-a may have a corresponding set of transmit power parameters including a transmission power of the transmit beam 305-a, an EIRP, and the like. Generally, the set of transmit power parameters may be used to configure the transmit beam 305-a for transmission, e.g., may define the coverage area or footprint of the transmit beam 305-a.

The wireless devices may perform an LBT procedure to capture the channel for the wireless transmission. The LBT procedure performed by the initiating wireless device may use sensing beam 310-a. For example, the wireless device may determine a set of channel sensing parameters, e.g., an energy detection threshold, the number/type of antenna element(s), a combination scheme for the antenna element(s), a channel type of the transmission opportunity associated with the LBT procedure, etc. The channel sensing parameters may generally define the coverage area (or footprint) of sensing beam 310-a. For reference purposes only, the original footprint of sensing beam 310-a is illustrated as coverage area 315-a and the original footprint of transmit beam 305-a is illustrated as coverage area 315-b in FIG. 3. In some examples, although illustrated as slightly smaller, the coverage area 315-a may be aligned (e.g., cover the same footprint) as the coverage area 315-b.

Broadly, wireless communication system 300 illustrates example paths (e.g., paths 320, 325, and/or 330) the wireless device may take to determine and adjust, if needed, the coverage areas of transmit beam 305-a and sensing beam 310-a associated with an LBT procedure. More particularly, a wireless device may identify the coverage areas of the transmit beam 305-a and sensing beam 310-a, determine whether the degree of overlap between the coverage areas satisfies a threshold, and, if not, modify the coverage area(s) of the transmit beam 305-a and/or the sensing beam 310-a such that the degree of overlap between the coverage areas satisfy the threshold.

Initially and starting on the left side of FIG. 3, the wireless device may identify the coverage area of the sensing beam 310-a (e.g., the coverage area 315-a) based on the channel sensing parameters, e.g., the energy detection threshold, associated with LBT procedure. This may include the wireless device identifying the energy detection threshold for the sensing beam 310-a. Similarly, the wireless device may identify the coverage area of the transmit beam 305-a (e.g., the coverage area 315-b) used for performing wireless transmissions associated with LBT procedure. The coverage area of the transmit beam 305-a may be based, at least in some aspects, on a set of transmit power parameters of transmit beam 305-a. Accordingly, the wireless device may identify the set of transmit power parameters for a transmit beam 305-a used for wireless transmissions associated with the LBT procedure. For illustrative purposes, example reference parameters associated with the sensing beam 310-a and the transmit beam 305-a are shown in Table 1.

TABLE 1

| Reference Parameters | |
| --- | --- |
| Energy Detection Threshold | $T_1$ |
| Transmission Power | $P_1$ |
| Transmission EIRP @ peak | $E_1$ |

The wireless device may determine whether the degree of overlap between the coverage area of the transmit beam 305-a and the coverage area of the sensing beam 310-a is within a threshold. For example, the wireless device may use the stringent threshold, the probabilistic threshold for all available transmission angles, the probabilistic threshold for the most relevant transmission angles, and the like, as discussed above, when determining whether the degree of overlap between the coverage areas satisfy the threshold. In some aspects, the particular technique used by wireless devices to determine whether the degree of overlap between the coverage areas satisfy a threshold may be signaled to the wireless device (e.g., in configuration or broadcast signaling) or may be hardcoded into the wireless device. In the situation where the degree of overlap satisfies the threshold, the wireless device may perform the LBT procedure using the sensing beam 310-a and proceed to perform the wireless transmissions using the transmit beam 305-a.

However, in the situation where the degree of overlap does not satisfy the threshold (e.g., based on the criteria of the particular technique used by the wireless device), the wireless device may adjust the transmit power parameters and/or the energy detection threshold to modify one or both of the coverage areas such that the degree of overlap is within the threshold. Exemplary non-limiting examples of how the wireless device may adjust the transmit power parameters and/or the energy detection threshold are illustrated with reference to paths 320, 325, and/or 330.

For example, the wireless device may follow path 320 and adjust parameters associated with the sensing beam 310-a (e.g., the energy detection threshold). In some examples, the wireless device may determine to increase the coverage area of sensing beam 310-a (e.g., to increase an overlap between the transmission beam 305-a and the sensing beam 310-a). In such examples, the wireless device may adjust the energy detection threshold of the sensing beam 310-a as shown in Table 2. For example, the wireless device may reduce the energy detection threshold by an amount $\Delta_R$, which may result in a sensing beam 310-b with a relatively larger coverage area or footprint than the coverage area 315-a of the sensing beam 310-a.

TABLE 2

Path 320 Exemplary Parameters

| Energy Detection Threshold | $T_1 - \Delta_R$ |
|---|---|
| Transmission Power | $P_1$ |
| Transmission EIRP @ peak | $E_1$ |

In some examples, the wireless device may determine to decrease the coverage area of sensing beam 310-a. In such examples, the wireless device may increase the energy detection threshold by a determined or pre-configured amount such as $\Delta_R$.

In some examples, the wireless device may follow path 325 and adjust parameters associated with the transmission beam 305-a (e.g., transmit power parameters such as transmission power, transmission EIRP, or both). For example, the wireless device may determine to increase the coverage area of transmission beam 305-a. In such examples, the wireless device may adjust the transmission power and the transmission EIRP of transmission beam 305-a as shown in Table 3. Such an adjustment may include increasing one or both of the transmission power and the transmission EIRP by an amount $\Delta_T$, which may result in a transmission beam 305-b with a larger footprint or coverage area than the coverage area 315-a associated with the transmission beam 305-a.

TABLE 3

Path 325 Exemplary Parameters

| Energy Detection Threshold | $T_1$ |
|---|---|
| Transmission Power | $P_1 + \Delta_T$ |
| Transmission EIRP @ peak | $E_1 + \Delta_T$ |

In some other examples, the wireless device may determine to decrease the coverage area of transmission beam 305-a (e.g., to increase an overlap between the transmission beam 305-a and the sensing beam 310-a). In such examples, the wireless device may instead reduce the transmission power, the transmission EIRP, or both by a determined or pre-configured amount such as $\Delta_T$.

In some examples, the wireless device may follow path 330 and adjust parameters associated with both the transmission beam 305-a and the sensing beam 310-a. For example, the wireless device may determine to increase the coverage area of both the transmission beam 305-a and the sensing beam 310-a. In such examples, the wireless device may adjust the parameters as shown in Table 4. Such an adjustment may include increasing the transmission power and the transmission EIRP by an amount $\Delta_T$ and decreasing the energy detection threshold by an amount $\Delta_R$, which may result in a transmission beam 305-b and a sensing beam 310-b with larger footprints or coverage areas than the coverage area 315-a. As illustrated in FIG. 3 and Table 4, the values of $\Delta_T$ and $\Delta_R$ are equivalent, but in other examples, the values may be different.

TABLE 4

Path 330 Exemplary Parameters

| Energy Detection Threshold | $T_1 - \Delta_R$ |
|---|---|
| Transmission Power | $P_1 + \Delta_T$ |
| Transmission EIRP @ peak | $E_1 + \Delta_T$ |

In some other examples, the wireless device may determine to decrease the coverage areas of both the transmission beam 305-a and the sensing beam 310-a. In such examples, the wireless device may increase the energy detection threshold and decrease the transmit parameters of the transmission beam 305-a. In yet other examples, the wireless device may determine to increase the coverage area of the sensing beam 310-a (e.g., decrease the energy detection threshold) and decrease the coverage area of the transmission beam 305-a (e.g., increase the transmission power). In some cases, the paths (e.g., paths 320, 325, and 330) and operations described with respect to FIG. 3 may be performed separately, together, or in other various combinations.

Figure 4:
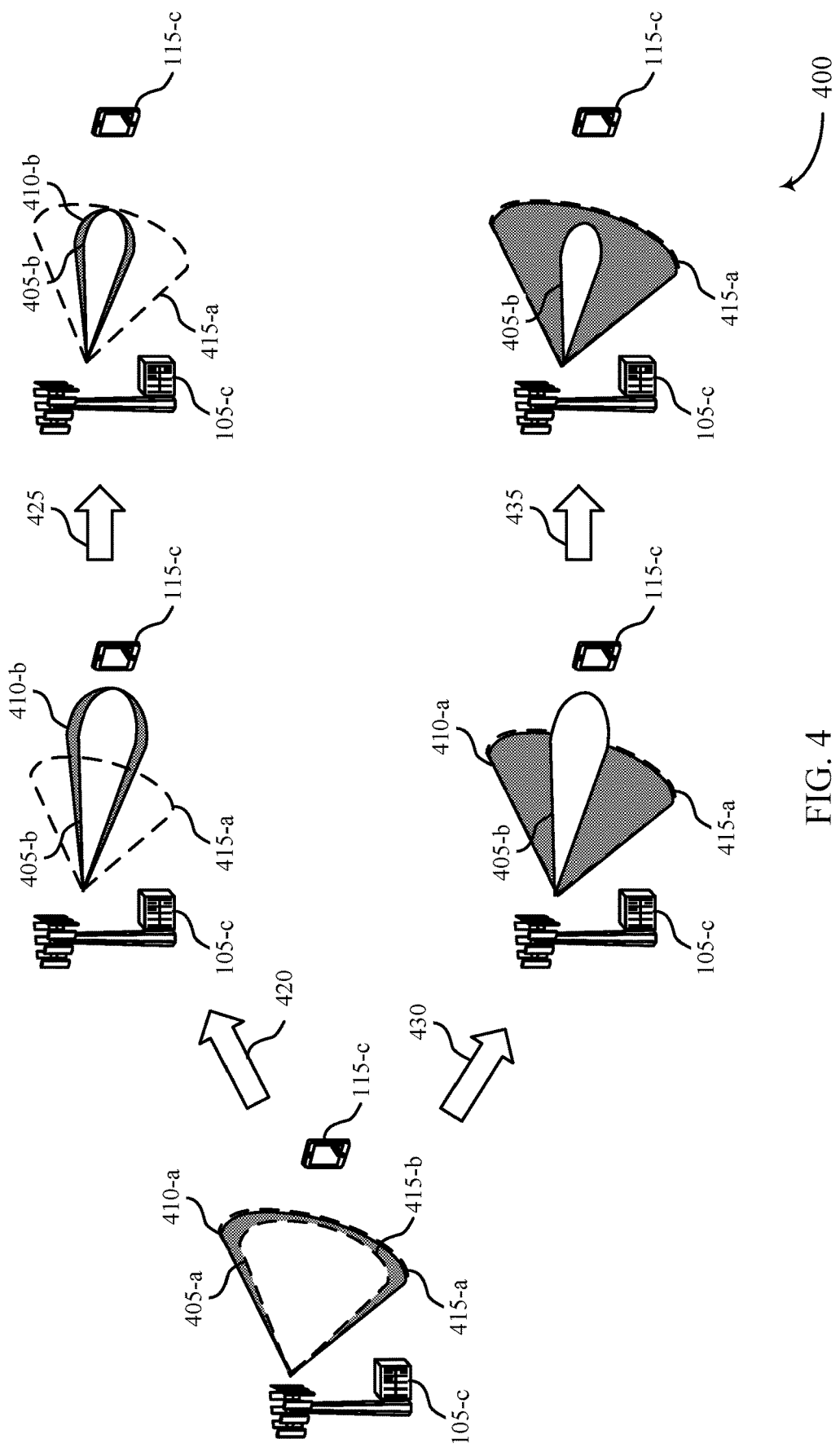

FIG. 4 illustrates an example of a wireless communications system 400 that supports listen-before-talk procedures in accordance with aspects of the present disclosure. In some examples, wireless communications system 400 may implement aspects of wireless communication systems 100, 200, and/or 300. Aspects of wireless communication system 400 may be implemented by base station 105-c and/or UE 115-c, which may be examples of the corresponding devices described herein. In some aspects, any of base station 105-c and/or a UE 115-c may be examples of a wireless device, as described herein. Accordingly, references to a wireless device may refer to any of base station 105-c and/or UE 115-c. Generally, FIG. 4 may illustrate an example of a wireless device determining to perform communications using a narrow transmit beam 405 (e.g., transmit beam 405-b) associated with a sensing beam 410 (e.g., a wide sensing beam 410-a or a narrow sensing beam 410-b).

In some aspects, wireless communication system 400 may be or include a mmW network operating in a shared or unlicensed radio frequency spectrum band. For example, base station 105-c and/or a UE 115-c may perform wireless communications using beamformed transmissions/receptions. Base station 105-c may perform a wireless transmission to UE 115-c using a transmit beam 405-a. Generally transmit beam 405-a may have its own corresponding set of parameters that are configured to provide the wireless transmission in the directional manner. For example, transmit beam 405-a may have a corresponding set of transmit power parameters including a transmission power of the transmit beam, an EIRP, and the like. Generally, the set of transmit power parameters may be used to configure the transmit beam 405-a for transmission, e.g., may define the coverage area or footprint of the transmit beam 405-a.

The wireless devices may perform an LBT procedure to capture the channel for the wireless transmission. The LBT procedure performed by the initiating wireless device may use sensing beam 410-*a*. For example, the wireless device may determine a set of channel sensing parameters, e.g., an energy detection threshold, the number/type of antenna element(s), a combination scheme for the antenna element(s), a channel type of the transmission opportunity associated with the LBT procedure, etc. The channel sensing parameters may generally define the coverage area (or footprint) of sensing beam 410-*a*. For reference purposes only, the original footprint of sensing beam 410-*a* is illustrated as coverage area 415-*a* and the original footprint of transmit beam 405-*a* is illustrated as coverage area 415-*b* in FIG. 4. In some examples, although illustrated as slightly smaller, the coverage area 415-*a* may be aligned (e.g., cover the same footprint) as the coverage area 415-*b*.

Broadly, wireless communication system 400 illustrates example paths (e.g., paths 420, 425, 430, and/or 435) the wireless device may take to determine and adjust, if needed, the coverage areas of transmit beam 405-*a* and/or sensing beam 410-*a* associated with an LBT procedure. More particularly, wireless device may identify the coverage areas of the transmit beam 405-*a* and sensing beam 410-*a*, determine whether the degree of overlap between the coverage areas satisfies a threshold, and, if not, modify or adjust the coverage area(s) of the transmit beam 405-*a* and/or the sensing beam 410-*a* such that the degree of overlap between the coverage areas satisfy the threshold.

Initially and starting on the left side of FIG. 4, the wireless device may identify the coverage area of the sensing beam 410-*a* (e.g., the coverage area 415-*a*) based on the channel sensing parameters, e.g., the energy detection threshold, associated with LBT procedure. This may include the wireless device identifying the energy detection threshold for the sensing beam 410-*a*. Similarly, the wireless device may identify the coverage area of the transmit beam 405-*a* (e.g., the coverage area 415-*b*) used for performing wireless transmissions associated with LBT procedure. The coverage area of the transmit beam 405-*a* may be based, at least in some aspects, on a set of transmit power parameters of transmit beam 405-*a*. Accordingly, the wireless device may identify the set of transmit power parameters (e.g., a transmission power and a transmission EIRP) for a transmit beam 405-*a* used for wireless transmissions associated with the LBT procedure. For illustrative purposes, example parameters associated with reference beams (e.g., broad beams such as the sensing beam 410-*a* and the transmit beam 405-*a*) are shown in Table 5.

TABLE 5

| Reference Parameters | |
|---|---|
| Energy Detection Threshold | $T_1$ |
| Transmission Power | $P_1$ |
| Transmission EIRP @ peak | $E_1$ |

In some examples, the wireless device may determine to use a relatively narrower beam for the transmit beam 405-*a*, the sensing beam 410-*a*, or both. In such examples, using the same parameters for the narrower beam may result in a different coverage area. For example, the wireless device may determine to use a narrower transmit beam (e.g., transmit beam 405-*b*) using the transmit power parameters of the transmit beam 405-*a*. In such examples, the coverage area of the narrower transmit beam 405-*b* may be different than the coverage area of a broader reference beam (e.g., the coverage area 415-*b* of the transmit beam 405-*a*). For instance, the narrower transmit beam may be more directional (e.g., covers less width), and using the same transmit power may consequently result in a larger antenna gain of the beam (e.g., covers more length or distance).

The wireless device may determine whether the degree of overlap between the coverage area of the narrower transmit beam (e.g., transmit beam 405-*b*) and the coverage area of the sensing beam 410-*a* or the coverage area of a narrower sensing beam (e.g., sensing beam 410-*b*) is within a threshold. For example, the wireless device may use the stringent threshold, the probabilistic threshold for all available transmission angles, the probabilistic threshold for the most relevant transmission angles, and the like, discussed herein when determining whether the degree of overlap between the coverage areas satisfy the threshold. In the situation where the degree of overlap satisfies the threshold, the wireless device may perform the LBT procedure using the sensing beam 410-*a* or the sensing beam 410-*b* and proceed to perform the wireless transmissions using the narrower transmit beam 405-*b*.

However, in the situation where the degree of overlap does not satisfy the threshold, the wireless device may adjust the transmit power parameters and/or the energy detection threshold to modify one or more of the coverage areas such that the degree of overlap is within the threshold. Exemplary non-limiting examples of how the wireless device may adjust the transmit power parameters and/or the energy detection threshold are illustrated with reference to paths 420, 425, 430, and/or 435.

For example, the wireless device may follow path 430 and determine to utilize a narrow transmit beam 405-*b* and the sensing beam 410-*a*. In such examples, due to the relatively narrower beam shape, using the same transmit power and energy detection threshold may result in a degree of overlap between the coverage area 415-*a* and the coverage area of transmit beam 405-*b* that fails to satisfy a threshold. For example, the coverage area of transmit beam 405-*b* may extend past the coverage area 415-*a* associated with the transmit beam 410-*a*. This situation may be illustrated by the set of parameters shown in Table 6.

TABLE 6

| Path 430 Parameters | |
|---|---|
| Energy Detection Threshold | $T_1$ |
| Transmission Power | $P_1$ |
| Transmission EIRP @ peak | $E_1 + G_A$ |

That is, due to using the same transmission power for the relatively narrower transmit beam 405-*b* as the relatively broader transmit beam 405-*a*, the transmission EIRP at the peak of the beam may be increased by a gain amount $G_A$, which may result in the transmit beam 405-*b* extending past the coverage area of the sensing beam 410-*a*. This may further result in communication errors, as an example, during an LBT procedure. For example, the wireless device may incorrectly determine that a communication channel is unoccupied because the transmit beam 405-*b* extends outside the coverage area of the sensing beam 410-*a*, and thus the transmit beam 405-*b* may interfere with other undetected transmissions.

Accordingly, the wireless device may determine to follow path 435 and adjust the set of transmit parameters associated with the transmit beam 405-*b*. For example, the wireless device may decrease the transmission EIRP by decreasing the transmission power by a gain amount $G_A$. Such an adjustment may result in the coverage area of the transmit beam 405-*b* being reduced to satisfy the overlap threshold between the transmit beam 405-*b* and the receive beam 410-*a* (e.g., such that the coverage area of the transmit beam 405-*b* is contained within the coverage area 415-*a*). Some example parameters resulting from the adjustment are shown in Table 7.

TABLE 7

Path 430 Parameters

| | |
|---|---|
| Energy Detection Threshold | $T_1$ |
| Transmission Power | $P_1 - G_A$ |
| Transmission EIRP @ peak | $E_1$ |

In some examples, the wireless device may follow path 420 and determine to utilize a narrow transmit beam 405-*b* and a narrow sensing beam 410-*b*. In such examples, due to the relatively narrower beam shape, using the same transmit power and energy detection threshold may result in the coverage areas of the narrow transmit beam 405-*b* and the narrow sensing beam 410-*b* extending past the coverage area 415-*a* associated with the transmit beam 410-*a*. This situation may be illustrated by the set of parameters previously shown in Table 6.

Accordingly, the wireless device may determine to follow path 425 and adjust one or more parameters of the transmit beam 405-*b*, the sensing beam 410-*b*, or both. For example, the wireless device may decrease the transmission EIRP by decreasing the transmission power by a gain amount $G_A$. Additionally or alternatively, the wireless device may increase the energy detection threshold by a gain amount $G_A$. Such an adjustment may result in the coverage area of the transmit beam 405-*b* and the coverage area of the sensing beam 410-*b* being reduced to be contained within the coverage area 415-*a*. Some example parameters resulting from the adjustment are shown in Table 8.

TABLE 8

Path 430 Parameters

| | |
|---|---|
| Energy Detection Threshold | $T_1 + G_A$ |
| Transmission Power | $P_1 - G_A$ |
| Transmission EIRP @ peak | $E_1$ |

In some examples, the techniques described herein may enable the wireless device to dynamically or semi-statically adjust one or more beam parameters (e.g., the transmission power, the transmission EIRP, the energy detection threshold) such that the coverage area of a transmit beam 405 is contained within the coverage area of a sensing beam 410. In some examples, the difference between the energy detection threshold of a sensing beam 410 (e.g., from a reference beam such as the sensing beam 410-*a*) and the difference between the transmission EIRP of a transmit beam 405 (e.g., from a reference beam such as the transmit beam 405-*a*) may be the same as the difference between the gain of the sensing beam 410 and the transmission beam 405 in the direction of the transmission. Accordingly, in some examples, the wireless device may determine the adjustment values (e.g., $G_A$) for the described techniques to satisfy a threshold of the overlap between the sensing beam 410 and the transmit beam 405. In other examples, the wireless device may be pre-configured (e.g., via RRC signaling or through manufactured settings) with the adjustment values.

Accordingly, the described techniques may enable the wireless device to reliably and successfully utilize directional beams, e.g., in a NR system and/or a shared spectrum. For example, a wireless device such as the base station 105-*c* may use the described techniques for transmitting one or more SSBs, a common PDCCH, or during a CSI-RS beam sweeping procedure. Additionally or alternatively, the techniques may be used by a wireless device (e.g., the UE 115-*c*) in an SRS beam sweeping procedure, for a PUCCH and/or a PUSCH transmission, etc. Further, the techniques may be used in a multi-TRP transmission or reception procedures. As an example, a wireless device (e.g., the base station 105-*c*) may perform a beam sweeping procedure such as an SRS or a CSI-RS beam sweeping procedure, and use the techniques described herein to determine whether an overlap of a receive beam (e.g., a sensing beam 410) and one or more transmit beams (e.g., a transmit beam 405) satisfy a threshold to ensure that the receive beam is accurately estimating channel conditions and occupancy. Additionally or alternatively, the techniques enable the wireless device to adjust one or more parameters of the receive beam, the one or more transmit beams, or any combination thereof such that the threshold is satisfied.

Figure 5:
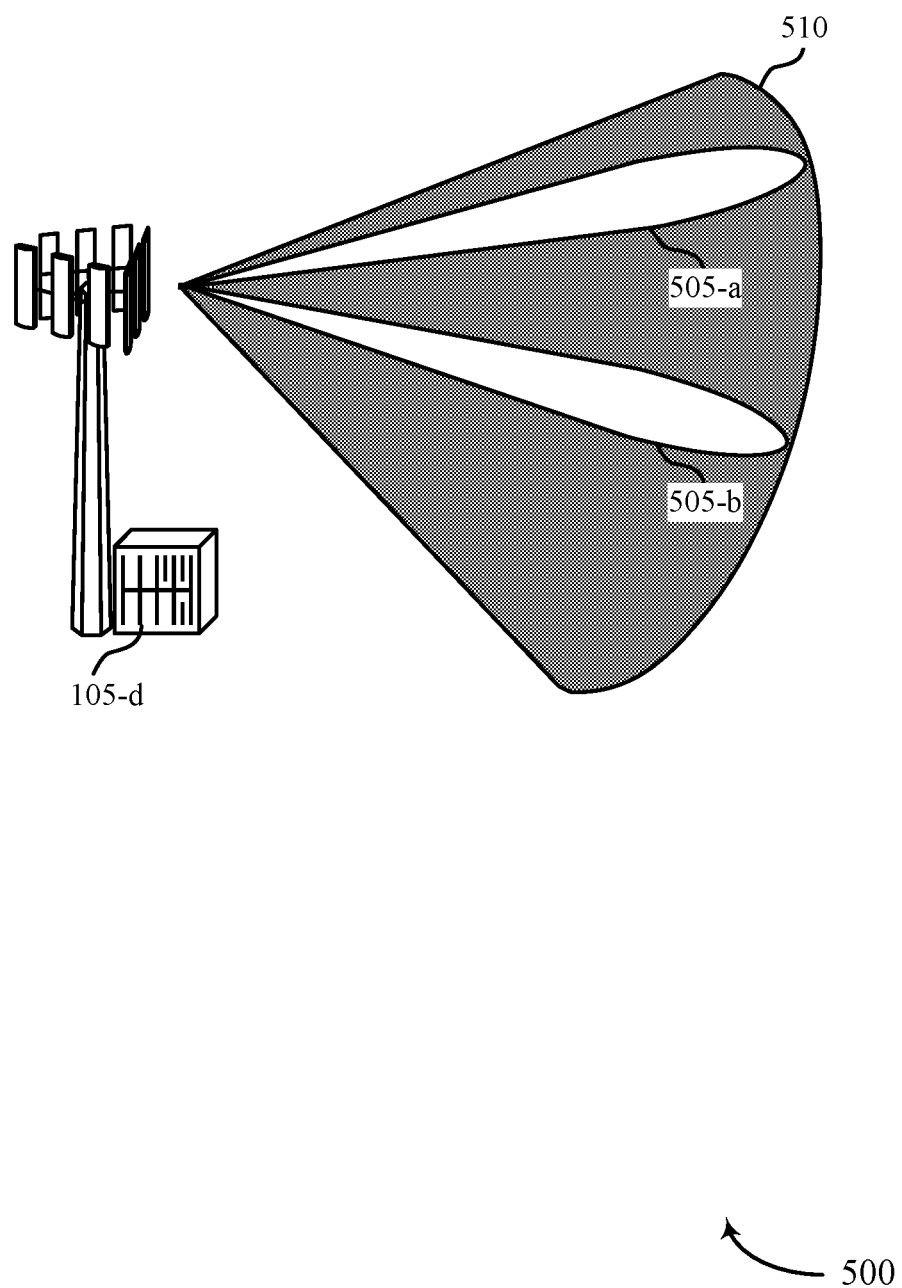

FIG. 5 illustrates an example of a wireless communications system 500 that supports listen-before-talk procedures in accordance with aspects of the present disclosure. In some examples, wireless communications system 500 may implement aspects of wireless communication systems 100, 200, 300, and/or 400. Aspects of wireless communication system 500 may be implemented by base station 105-*d*, which may be examples of the corresponding device described herein. In some aspects, base station 105-*d* may be an example of a wireless device, as described herein. Accordingly, references to a wireless device may refer to base station 105-*d*. However, the described techniques performed by a wireless device may also be implemented by a UE, which may be an example of the corresponding device described herein. Generally, FIG. 5 may illustrate an example of a wireless device (e.g., base station 105-*d* or a UE) using multiple narrow transmit beams 505 associated with a sensing beam 510.

In some aspects, wireless communication system 500 may be or include a mmW network operating in a shared or unlicensed radio frequency spectrum band. For example, base station 105-*d* and/or a UE 115-*d* may perform wireless communications using beamformed transmissions/receptions. Base station 105-*d* may perform a wireless transmission to a UE using a transmit beam 505-*a*. In some examples, base station 105-*d* may perform another wireless transmission to a UE using a transmit beam 505-*b*. For example, the base station 105-*d* may transmit a type 2 CSI codebook resulting in multiple independent transmit beams 505. In such an example, the techniques described herein may enable the base station 105-*d* to transmit the multiple transmit beams 505 after performing an LBT procedure with a sensing beam 510 (e.g., when the sensing beam 510 is a directional sensing beam with a coverage area containing the coverage area of the multiple transmit beams 505).

Generally, the transmit beam 505-*a* and the transmit beam 505-*b* may each have a corresponding set of parameters that are configured to provide the wireless transmission in a directional manner. For example, the transmit beam 505-*a* and the transmit beam 505-*b* may each have a corresponding set of transmit power parameters including a transmission power of the transmit beam, an EIRP, and the like. Generally, the set of transmit power parameters may be used to configure the transmit beams 505 for transmission, e.g., may define the coverage area or footprint of each transmit beam 505.

The wireless devices may perform an LBT procedure to capture the channel for the wireless transmission. The LBT procedure performed by the initiating wireless device may use sensing beam 510. For example, the wireless device may determine a set of channel sensing parameters, e.g., an energy detection threshold, the number/type of antenna element(s), a combination scheme for the antenna element(s), a channel type of the transmission opportunity associated with the LBT procedure, etc. The channel sensing parameters may generally define the coverage area (or footprint) of the sensing beam 510.

As discussed herein, the wireless device may determine an overlap between the sensing beam 510 and one or both of the transmit beam 505-a and the transmit beam 505-b. For example, as discussed above, the wireless device may determine to use two narrow transmission beams 505 using one or more parameters of a reference beam (e.g., transmit beam 405-a as described with reference to FIG. 4). In such examples, the wireless device may determine to adjust one or more parameters of the transmit beam 505-a, the transmit beam 505-b, and the sensing beam 510. For example, the transmission power of one or both of the transmit beams 505-a and 505-b may be decreased from a reference transmission power such that the coverage areas of the transmit beams 505 may be contained in the coverage area of the sensing beam 510. Additionally or alternatively, the energy detection threshold of the sensing beam 510 may be decreased such that the coverage area of the sensing beam 510 includes the coverage areas of the transmit beams 505.

In some examples, the wireless device may determine a set of adjustments for multiple beams (e.g., the transmit beam 505-a and the transmit beam 505-b) associated with the sensing beam 510. For example, the wireless device may determine that an overlap between the coverage area of transmit beam 505-a and the coverage area of the sensing beam 510 may satisfy a threshold using the parameters shown in Table 9, where the variables may correspond to the variables described in Tables 1-8. For instance, the transmission power may be reduced from a reference transmission power $P_1$ by a gain adjustment of $G_{A1}$ while maintaining a reference energy detection threshold $T_1$ and a reference transmission EIRP $E_1$.

TABLE 9

| Parameters | |
| --- | --- |
| Energy Detection Threshold | $T_1$ |
| Transmission Power | $P_1 - G_{A1}$ |
| Transmission EIRP @ peak | $E_1$ |

Additionally or alternatively, the wireless device may determine that an overlap between the coverage area of transmit beam 505-b and the coverage area of the sensing beam 510 may satisfy a threshold using the parameters shown in Table 10.

TABLE 10

| Parameters | |
| --- | --- |
| Energy Detection Threshold | $T_1$ |
| Transmission Power | $P_1 - G_{A2}$ |
| Transmission EIRP @ peak | $E_1$ |

In some examples, the transmit beam 505-a and the transmit beam 505-b may be transmitted using the same time resources (e.g., by FDM techniques)). In such examples, the wireless device may determine to use one or more transmit power parameters for both transmit beams 505. For example, the wireless device may use the same transmission power for both devices due to the transmissions occurring across the same time resources. Accordingly, the wireless device may compare the adjustments (e.g., gain adjustments $G_{A1}$ and $G_{A2}$) and determine to adjust one or more parameters of the transmit beams 505 or the sensing beam 510 based on the comparison. For example, the wireless device may determine to reduce the transmission power of both the transmit beam 505-a and the transmit beam 505-b by the relatively greater gain as shown in Table 11, such that the coverage areas of both the transmit beam 505-a and the transmit beam 505-b may be contained in the coverage area of the sensing beam 510.

TABLE 11

| Parameters | |
| --- | --- |
| Energy Detection Threshold | $T_1$ |
| Transmission Power | $P_1 - \max(G_{A1}, G_{A2})$ |
| Transmission EIRP @ peak | $E_1$ |

In some other examples, the transmit beam 505-a and the transmit beam 505-b may be transmitted using different time resources (e.g., using TDM techniques). In such examples, the wireless device may perform the determined adjustments for each beam (e.g., using the parameters in Table 9 for the transmit beam 505-a and the parameters in Table 10 for the transmit beam 505-b).

Additionally or alternatively to adjusting one or more transmit parameters (e.g., the transmission power parameters), the wireless device may adjust an energy detection threshold of the sensing beam 510. For example, the wireless device may adjust the energy detection threshold such that the overlap between the coverage area of the sensing beam 510 and the transmit beams 510-a and 510-b satisfy a threshold. In such examples, the wireless device may compare values determined to satisfy the threshold associated with each of the transmit beams 510 and use the value that satisfies all of them (e.g., provides coverage for each transmit beam 510).

In some examples, the wireless device (e.g., a base station 105-d) may be enabled to use multiple transmit beams 505 but may be unaware of the antenna gains for each transmit beam 505. For example, the wireless device may transmit multiple reference signals (e.g., in a CSI-RS procedure) using multiple transmit beams 505, but may not have received feedback for which beam or beams to use for communications with a UE (e.g., based on a channel measurement for one or more of the beams). In such examples, the wireless device may transmit multiple transmit beams 505 (e.g., reference signals) that satisfy the overlap threshold with the sensing beam 510. Such a selection may enable the wireless device to utilize the same parameters of a reference sensing beam 510 (e.g., the sensing beam 305-a) to provide flexibility for selecting a transmit beam 505 for communications with a UE.

Figure 6:
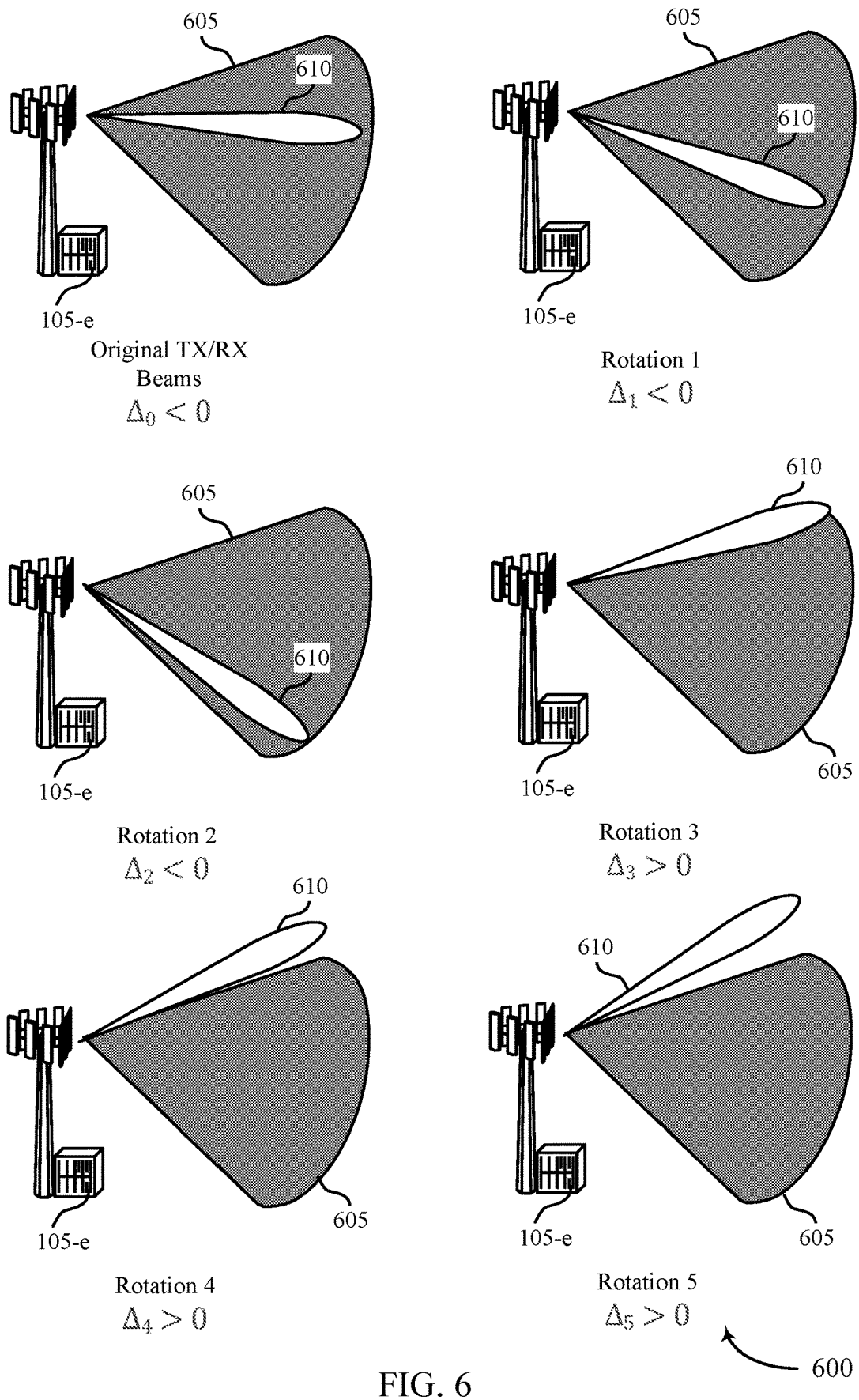

FIG. 6 illustrates an example of a wireless communications system 600 that supports listen-before-talk procedures in accordance with aspects of the present disclosure. In some examples, wireless communications system 600 may implement aspects of wireless communication systems 100, 200, 300, and/or 400. Aspects of wireless communication system 600 may be implemented by base station 105-e, which may be examples of the corresponding device described herein. In some aspects, base station 105-e may be an example of a wireless device, as described herein. Accordingly, references to a wireless device may refer to base station 105-e. However, the described techniques performed by a wireless device may also be implemented by a UE, which may be an example of the corresponding device described herein.

Broadly, wireless communication system 600 illustrates an example approach to determining whether the degree of overlap between the coverage area of a sensing beam 605 and the coverage area of a transmit beam 610 satisfy a threshold. As discussed above, a wireless device may identify and adjust, if needed, the coverage areas of transmit beam 610 and/or sensing beam 605 associated with an LBT procedure. More particularly, a wireless device may identify the coverage areas of the transmit beam 610 and sensing beam 605 to determine whether the degree of overlap between the coverage areas satisfies a threshold, and, if not, modify or adjust the coverage area(s) of the transmit beam 610 and/or the sensing beam 605 such that the degree of overlap between the coverage areas satisfy the threshold.

The wireless device may identify the coverage area of the sensing beam 605 (e.g., a first coverage area) based on the channel sensing parameters, e.g., the energy detection threshold, associated with LBT procedure. This may include the wireless device identifying the energy detection threshold for the sensing beam 605. Similarly, the wireless device may identify the coverage area of the transmit beam 610 (e.g., a second coverage area) used for performing wireless transmissions associated with LBT procedure. The coverage area of the transmit beam 610 may be based, at least in some aspects, on a set of transmit power parameters of transmit beam 610. Accordingly, the wireless device may identify the set of transmit power parameters for a transmit beam 610 used for wireless transmissions associated with the LBT procedure.

The wireless device may determine whether the degree of overlap between the coverage area of the transmit beam 610 and the coverage area of the sensing beam 605 satisfies a threshold. For example, the wireless device may perform an overlap determination for a transmit beam 610 and a sensing beam 605 illustrated in the upper left corner of FIG. 6 as the "Original TX/RX beams." Then, the wireless device may calculate the difference in array gain ($\Delta$) between the sensing beam 605 and the transmit beam 610 for the original TX/RX beams (i.e., the original transmit beam 610). The wireless device may also calculate a difference in array gain between the sensing beam 605 and one or more rotated transmit beams 610 (e.g., the original transmit beam 610 if one or more angles are adjusted) to identify that the original transmit beam 610 satisfies an overlap threshold with the sensing beam 605. Based on whether the original transmit beam 610 satisfies the threshold, the wireless device may use the original transmit beam 610 for communications (e.g., a transmission of data) with another wireless device. Additionally or alternatively, the wireless device may determine to use a rotated transmit beam 610 (e.g., when the original transmit beam 610 fails to satisfy the threshold, or if a rotated transmit beam 610 is determined to be more suitable for communications) or otherwise adjust one or more parameters of the original transmit beam 610.

Mathematically, the difference between the array gain of the transmit beam 610 and the sensing beam 605 in a direction of the peak of the transmit beam may be illustrated using $A_{TX}(\theta,\emptyset)$ representing the shape of the transmit beam 610 and $A_{RX}(\theta,\emptyset)$ representing the shape of the sensing beam 605. For example, the difference between the array gain of the original transmit beam 610 and the sensing beam 605 may be represented by $\Delta_{0,0}$ or $\Delta_0$. The difference may be represented mathematically as $\Delta_0 = A_{RX}(\theta,\emptyset) - A_{TX}(\theta,\emptyset)$. As illustrated in FIG. 6, this may result in a negative value for $\Delta_0$ (e.g., because the peak array gain of the transmit beam 610 is less than the peak array gain of the sensing beam 605 in the direction of the transmit beam 610).

The wireless device may also determine a rotated transmit beam 610 (e.g., rotated from the original transmit beam 610), where the rotated transmit beam 610 may be represented by $(\theta_i,\emptyset_j)A_{TX}(\theta,\emptyset)$. For each rotation, the wireless device may calculate or otherwise determine the difference in array gain between the peak of the rotated transmit beam 610 and the peak of the sensing beam 605 in the direction of the rotated transmit beam 610. For example, the wireless device may determine a rotated transmit beam 610 in Rotation 1. The wireless device may compute the difference of the array gains ($\Delta_1$) between the peak transmit direction of the rotated transmit beam 610 and the peak of receive beam 605 in that direction. In some examples, such a difference may be mathematically represented as $\Delta_{(\theta_i,\Phi_j)} = \text{Rotate}(\theta_i,\phi_j)(A_{TX}(\theta,\phi)) - A_{RX}[\theta,\phi]$. The wireless device may perform multiple calculations for several different rotations of the original transmit beam 610 (e.g., Rotations 1-5 illustrated in FIG. 6).

Thus, the wireless device may compute the difference in array gains ($\Delta$) between the peak transmit direction of each of the rotated transmit beams 610 and the peak of the receive beam 605 in the direction of each rotated transmit beam 610. In some aspects, the wireless device may determine a $\Delta_{max}$, which may be defined as the $\max(\Delta_{(\theta_i,\Phi_j)})$ or the largest $A_{(\theta_i,\Phi_j)}$ calculated from the rotated transmit beams 610 (e.g., Rotations 1-5). If $\Delta_{max}$ minus the $\Delta_{0,0}$ (e.g., the difference of the array gains between the original TX/RX beams) is within one or more thresholds, then transmission on the original transmit beam 610 may be supported.

In some examples, the wireless device may determine whether the difference between $\Delta_{max}$ and $\Delta_{0,0}$ is upper bounded by a relatively small value. For example, the wireless device may determine that the difference between the $\Delta$ of the original transmit beam 610 and any of the calculated $\Delta_{(\theta_i,\Phi_j)}$ (e.g., the difference in array gains for each of the rotations of the transmit beam 610) may be relatively small. In such examples, the wireless device may determine to use the original transmit beam 610 for communications. In some other examples, the wireless device may determine whether the difference between $\Delta_{max}$ and $\Delta_{0,0}$ satisfies a threshold (e.g., a relatively larger and positive value). For example, a calculation of whether the threshold is satisfied may be mathematically represented as $\Delta_{max} - \Delta_{0,0} > $Threshold, where the threshold is a relatively large and positive value. If the wireless device determines that the threshold is satisfied, the wireless device may use the original transmit beam 610 for communications. In the situation where the threshold is satisfied (e.g., the degree of overlap between the original transmit beam 610 and the sensing beam 605 is determined to be sufficient), the wireless device may perform the LBT procedure using the sensing beam 605 and proceed to perform the wireless transmissions using the original transmit beam 610. However, in the situation where the threshold is not satisfied, the wireless device may adjust the transmit power parameters and/or the energy detection threshold to modify one or both of the coverage areas such that the degree of overlap is within the threshold, as is discussed herein. Additionally or alternatively, the wireless device may determine to use a rotated transmit beam 610 that does satisfy the threshold.

Figure 7:
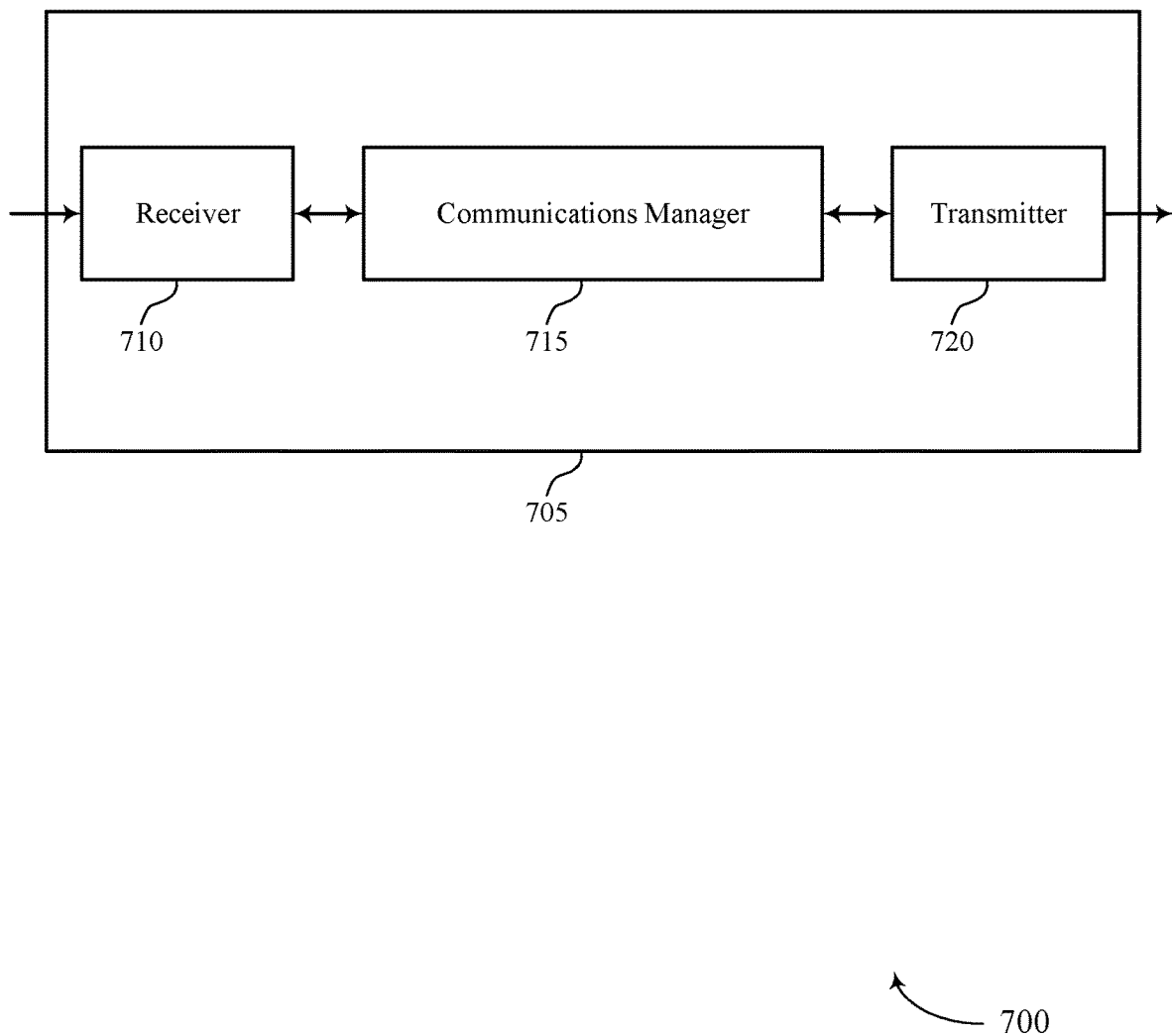
FIGS. 7 and 8 show block diagrams of devices that support listen-before-talk procedures in accordance with aspects of the present disclosure.

FIG. 7 shows a block diagram 700 of a device 705 that supports listen-before-talk procedures in accordance with aspects of the present disclosure. The device 705 may be an example of aspects of a UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to channel access procedures such as listen-before-talk procedures, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may identify an energy detection threshold for a sensing beam associated with a channel access procedure, identify a set of transmit power parameters for a transmit beam used for performing wireless transmissions associated with the channel access procedure, adjust the set of transmit power parameters, the energy detection threshold, or both, based on a degree of overlap between a coverage area of the transmit beam and a coverage area of the sensing beam, and perform the channel access procedure based on the adjusting. The communications manager 715 may also identify a second coverage area for a transmit beam used for performing wireless transmissions associated with a channel access procedure, the second coverage area based on a set of transmit power parameters of the transmit beam, determine whether a degree of overlap between the second coverage area and a first coverage area for a sensing beam associated with the channel access procedure is within a threshold, and perform the channel access procedure based on the determining. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 715 as described herein may be implemented to realize one or more potential advantages. One implementation may enable a wireless device, such as a UE 115 or a base station 105, to utilize directional beam sensing for wireless communications (e.g., an LBT procedure). Additionally or alternatively, the wireless device may efficiently and reliably determine whether an overlap between a coverage area of a sensing beam and a coverage area of one or more transmit beams satisfy a threshold. Another implementation may enable the wireless device to adjust one or more parameters of the sensing beam, one or more transmit beams, or a combination thereof (e.g., such that the coverage areas satisfy the threshold). Such implementations may enable the wireless device to accurately detect channel conditions, for example, in an LBT procedure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
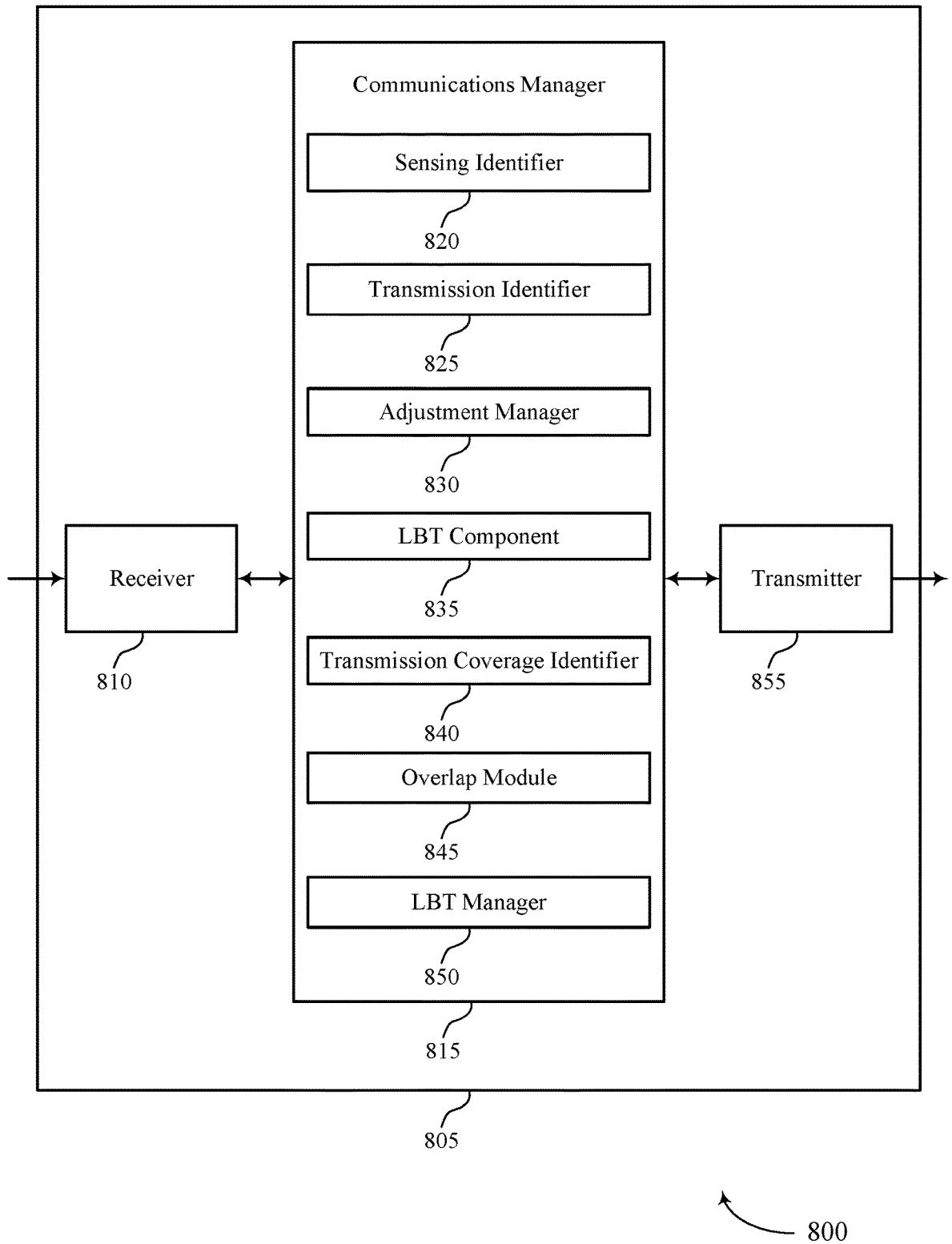

FIG. 8 shows a block diagram 800 of a device 805 that supports listen-before-talk procedures in accordance with aspects of the present disclosure. The device 805 may be an example of aspects of a device 705, a UE 115, or a base station 105 as described herein. The device 805 may include a receiver 810, a communications manager 815, and a transmitter 855. The device 805 may also include a processor. Each of these components may be in communication with one another (e.g., via one or more buses).

Receiver 810 may receive information such as packets, user data, or control information associated with various information channels (e.g., control channels, data channels, and information related to channel access procedures such as listen-before-talk procedures, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include a sensing identifier 820, a transmission identifier 825, an adjustment manager 830, an LBT component 835, a transmission coverage identifier 840, an overlap module 845, and an LBT manager 850. The communications manager 815 may be an example of aspects of the communications manager 1010 or 1110 as described herein.

The sensing identifier 820 may identify an energy detection threshold for a sensing beam associated with a channel access procedure.

The transmission identifier 825 may identify a set of transmit power parameters for a transmit beam used for performing wireless transmissions associated with the channel access procedure.

The adjustment manager 830 may adjust the set of transmit power parameters, the energy detection threshold, or both, based on a degree of overlap between a coverage area of the transmit beam and a coverage area of the sensing beam.

The LBT component 835 may perform the channel access procedure based on the adjusting.

The transmission coverage identifier 840 may identify a second coverage area for a transmit beam used for performing wireless transmissions associated with a channel access procedure, the second coverage area based on a set of transmit power parameters of the transmit beam.

The overlap module 845 may determine whether a degree of overlap between the second coverage area and a first coverage area for a sensing beam associated with the channel access procedure is within a threshold.

The LBT manager 850 may perform the channel access procedure based on the determining.

Transmitter 855 may transmit signals generated by other components of the device 805. In some examples, the transmitter 855 may be collocated with a receiver 810 in a transceiver module. For example, the transmitter 855 may be an example of aspects of the transceiver 1020 or 1120 as described with reference to FIGS. 10 and 11. The transmitter 855 may utilize a single antenna or a set of antennas.

Figure 9:
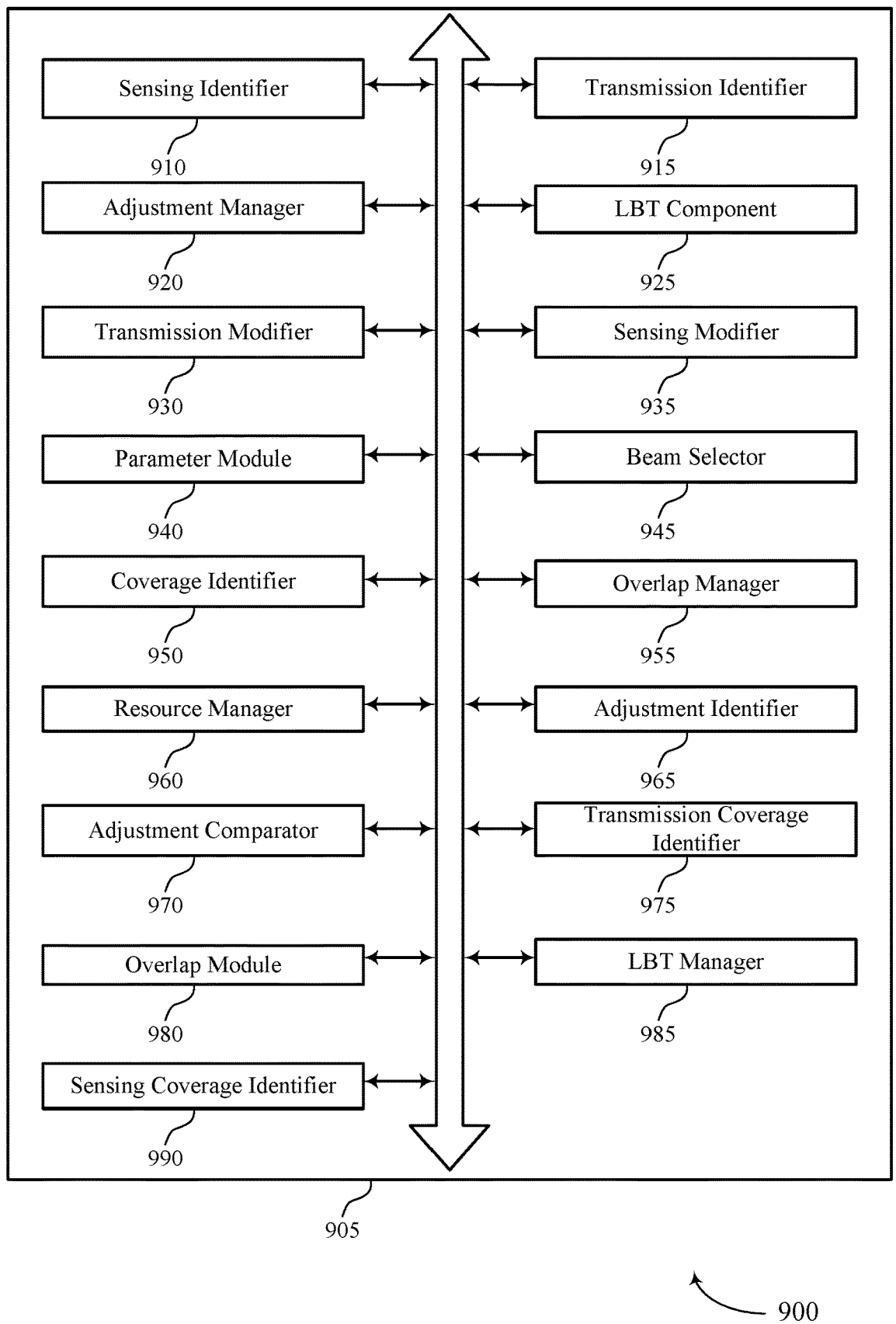
FIG. 9 shows a block diagram of a communications manager that supports listen-before-talk procedures in accordance with aspects of the present disclosure.

FIG. 9 shows a block diagram 900 of a communications manager 905 that supports listen-before-talk procedures in accordance with aspects of the present disclosure. The communications manager 905 may be an example of aspects of a communications manager 715, a communications manager 815, or a communications manager 1010 described herein. The communications manager 905 may include a sensing identifier 910, a transmission identifier 915, an adjustment manager 920, a LBT component 925, a transmission modifier 930, a sensing modifier 935, a parameter module 940, a beam selector 945, a coverage identifier 950, an overlap manager 955, a resource manager 960, an adjustment identifier 965, an adjustment comparator 970, a transmission coverage identifier 975, an overlap module 980, a LBT manager 985, and a sensing coverage identifier 990. Each of these modules may communicate, directly or indirectly, with one another (e.g., via one or more buses).

The sensing identifier 910 may identify an energy detection threshold for a sensing beam associated with a channel access procedure. In some cases, the sensing beam includes a directional sensing beam.

The transmission identifier 915 may identify a set of transmit power parameters for a transmit beam used for performing wireless transmissions associated with the listen-before-talk procedure. In some examples, the transmission identifier 915 may identify a second set of transmit power parameters for a second transmit beam used for performing wireless transmissions associated with the channel access procedure. In some cases, the set of transmit power parameters includes a transmission power of the transmit beam, an EIRP of the transmit beam, or a combination thereof. In some cases, the transmit beam includes a SSB, a data channel, a control channel, a reference signal, a beam of a beam sweeping procedure, or any combination thereof.

The adjustment manager 920 may adjust the set of transmit power parameters, the energy detection threshold, or both, based on a degree of overlap between a coverage area of the transmit beam and a coverage area of the sensing beam. In some examples, the adjustment manager 920 may adjust the set of transmit power parameters, the second set of transmit power parameters, the energy detection threshold, or a combination thereof, based on a degree of overlap between the coverage area of the transmit beam, a coverage area of the second transmit beam, and the coverage area of the sensing beam. An advantage of adjusting the set of transmit power parameters, the energy detection threshold, or both, based on the degree of overlap may include dynamically modifying the coverage area of the transmit beam and the coverage area of the sensing beam such that the sensing beam contains the transmit beam, which may result in accurate channel detection, power savings and/or reducing processing overhead based on the directional sensing beam (e.g., due to using less array antennas for detecting channel communications for a directional receive beam), among other advantages.

The LBT component 925 may perform the channel access procedure based on the adjusting.

The transmission coverage identifier 975 may identify a second coverage area for a transmit beam used for performing wireless transmissions associated with a channel access procedure, the second coverage area based on a set of transmit power parameters of the transmit beam. In some cases, the set of transmit power parameters includes a transmission power of the transmit beam, an EIRP of the transmit beam, or a combination thereof. In some cases, the transmit beam includes an SSB, a data channel, a control channel, a reference signal, a beam of a beam sweeping procedure, or any combination thereof.

The overlap module 980 may determine whether a degree of overlap between the second coverage area and a first coverage area for a sensing beam associated with the channel access procedure is within a threshold. In some cases, the sensing beam includes a directional sensing beam. In some examples, the overlap module 980 may determine, for all available transmission angles of the transmit beam, that the first coverage area overlaps all of the second coverage area within the threshold.

In some examples, the overlap module 980 may identify, for all available transmission angles of the transmit beam, a probability metric associated with the degree of overlap between the first coverage area and the second coverage area. In some examples, the overlap module 980 may determine that the probability metric is within the threshold based on the probability metric being within the threshold. In some examples, the overlap module 980 may identify a maximum transmission power for a first set of transmission angles of the transmit beam.

In some examples, the overlap module 980 may identify a subset of transmission angles for the transmit beam, each transmission angle in the subset of transmission angles including a transmission power within a threshold value of the maximum transmission angle. In some examples, the overlap module 980 may determine that the coverage areas of the transmit beam for each transmission angle in the subset of transmission angles is within the threshold. In some examples, the overlap module 980 may calculate, for each transmission angle within a set of transmission angles of the transmit beam, a difference in gain between the transmit beam and the sensing beam. In some examples, the overlap module 980 may identify a subset of transmission angles for the transmit beam in which the difference in gain is within the threshold.

The LBT manager 985 may perform the channel access procedure based on the determining.

The transmission modifier 930 may modify the coverage area of the transmit beam to increase the degree of overlap based on adjusting the set of transmit power parameters. In some examples, the transmission modifier 930 may decrease the coverage area of the transmit beam based on decreasing one or more values of the set of transmit power parameters. In some examples, the transmission modifier 930 may modify the coverage area of the second transmit beam to increase a degree of overlap between the second transmit beam and the receive beam based on the identified adjustment. In some examples, the transmission modifier 930 may modify the coverage area of the transmit beam and the coverage area of the second transmit beam using the larger adjustment.

The sensing modifier 935 may modify the coverage area of the sensing beam to increase the degree of overlap based on adjusting the energy detection threshold. In some examples, the sensing modifier 935 may increase the coverage area of the sensing beam based on decreasing the energy detection threshold.

The parameter module 940 may determine a set of channel sensing parameters associated with the sensing beam based on a transmission opportunity associated with the transmit beam. In some cases, the set of channel sensing parameters includes an antenna element, a set of antenna elements, an antenna element combination scheme, a channel type of the transmission opportunity, or a combination thereof.

The beam selector 945 may select a beam pattern for the sensing beam based on the set of channel sensing parameters.

The coverage identifier 950 may identify the coverage area of the sensing beam and the coverage area of the transmit beam.

The overlap manager 955 may determine that the degree of overlap between the coverage area of the sensing beam and the coverage area of the transmit beam fails to satisfy an overlap threshold. In some cases, the overlap threshold includes a difference between a gain for one or more angles of the transmit beam and a gain for one or more angles of the receive beam.

The resource manager 960 may determine that the second transmit beam is transmitted on different time resources than the transmit beam. In some examples, the resource manager 960 may determine that the second transmit beam is transmitted concurrently with the transmit beam.

The adjustment identifier 965 may identify an adjustment for the second set of transmit power parameters. In some examples, the adjustment identifier 965 may identify an adjustment for the set of transmit power parameters and an adjustment for the second set of transmit power parameters.

The adjustment comparator 970 may compare the adjustment for the set of transmit power parameters with the adjustment for the second set of transmit power parameters.

The sensing coverage identifier 990 may identify the first coverage area for the sensing beam based on an energy detection threshold associated with the channel access procedure.

Figure 10:
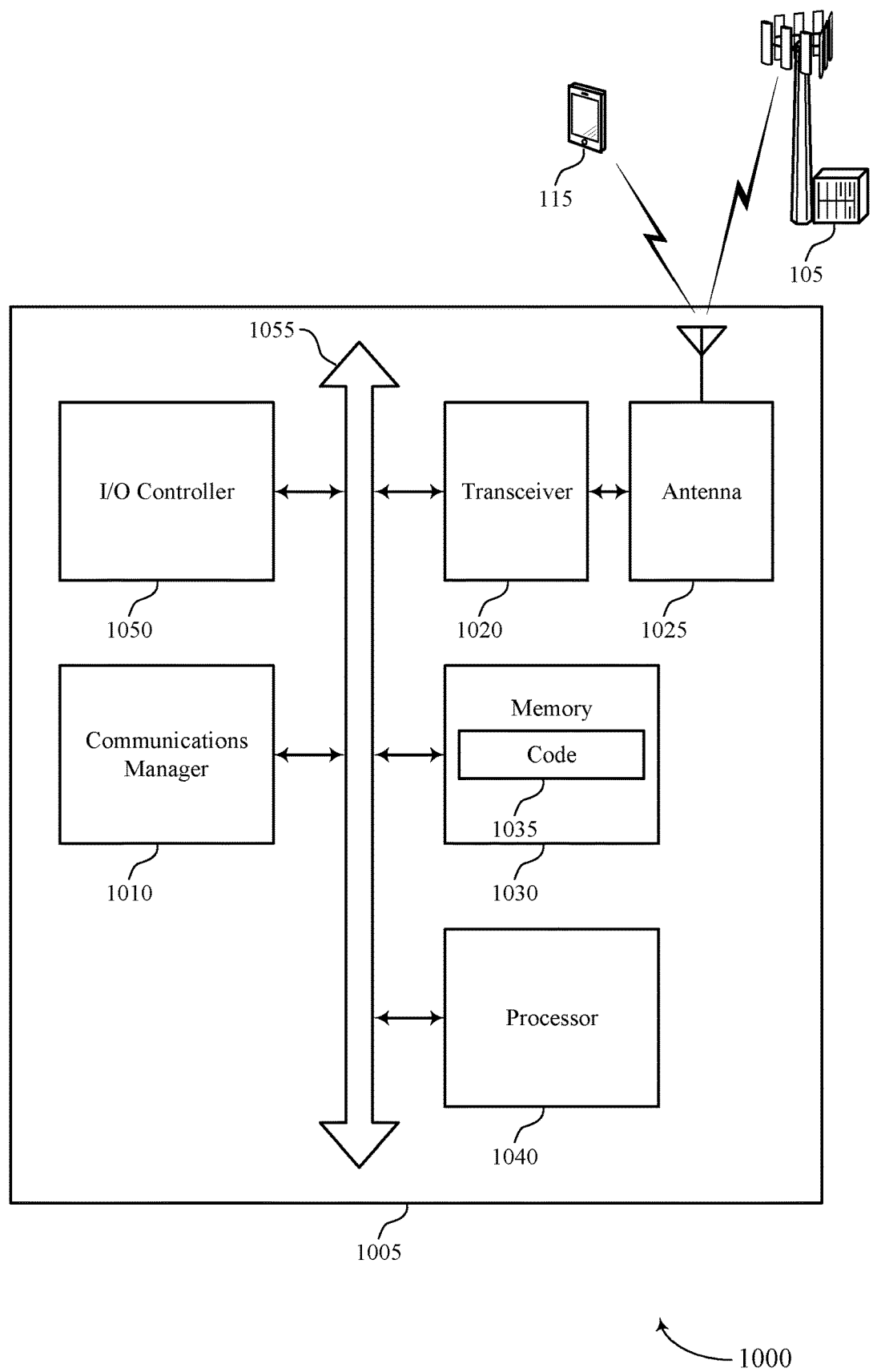
FIG. 10 shows a diagram of a system including a user equipment (UE) that supports listen-before-talk procedures in accordance with aspects of the present disclosure.

FIG. 10 shows a diagram of a system 1000 including a device 1005 that supports channel access procedures in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may identify an energy detection threshold for a sensing beam associated with a channel access procedure, identify a set of transmit power parameters for a transmit beam used for performing wireless transmissions associated with the channel access procedure, adjust the set of transmit power parameters, the energy detection threshold, or both, based on a degree of overlap between a coverage area of the transmit beam and a coverage area of the sensing beam, and perform the channel access procedure based on the adjusting. The communications manager 1010 may also identify a second coverage area for a transmit beam used for performing wireless transmissions associated with a channel access procedure, the second coverage area based on a set of transmit power parameters of the transmit beam, determine whether a degree of overlap between the second coverage area and a first coverage area for a sensing beam associated with the channel access procedure is within a threshold, and perform the channel access procedure based on the determining.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting channel access procedures).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
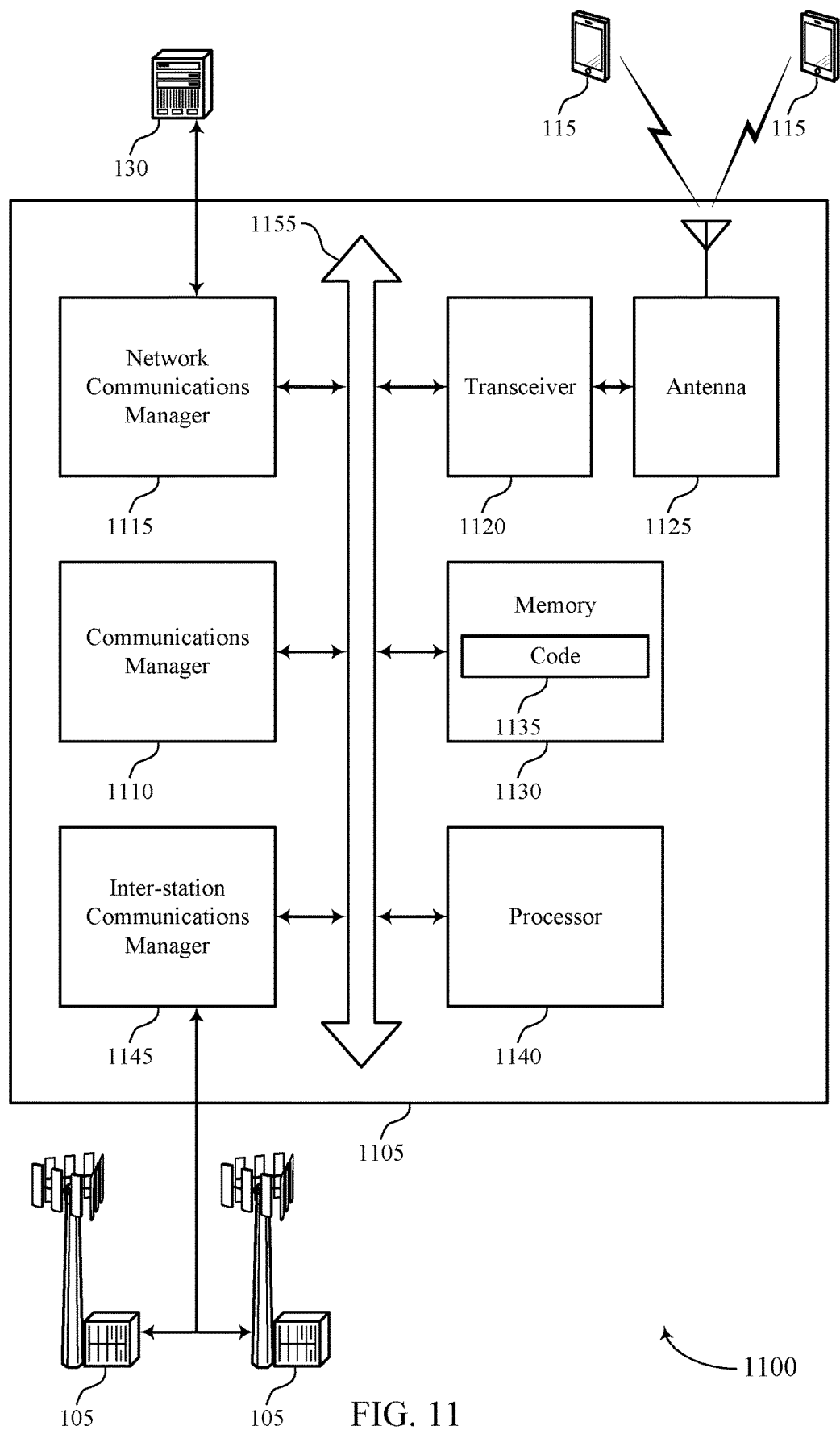
FIG. 11 shows a diagram of a system including a base station that supports listen-before-talk procedures in accordance with aspects of the present disclosure.

FIG. 11 shows a diagram of a system 1100 including a device 1105 that supports channel access procedures in accordance with aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may identify an energy detection threshold for a sensing beam associated with a channel access procedure, identify a set of transmit power parameters for a transmit beam used for performing wireless transmissions associated with the channel access procedure, adjust the set of transmit power parameters, the energy detection threshold, or both, based on a degree of overlap between a coverage area of the transmit beam and a coverage area of the sensing beam, and perform the channel access procedure based on the adjusting. The communications manager 1110 may also identify a second coverage area for a transmit beam used for performing wireless transmissions associated with a channel access procedure, the second coverage area based on a set of transmit power parameters of the transmit beam, determine whether a degree of overlap between the second coverage area and a first coverage area for a sensing beam associated with the channel access procedure is within a threshold, and perform the channel access procedure based on the determining.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting listen-before-talk procedures).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
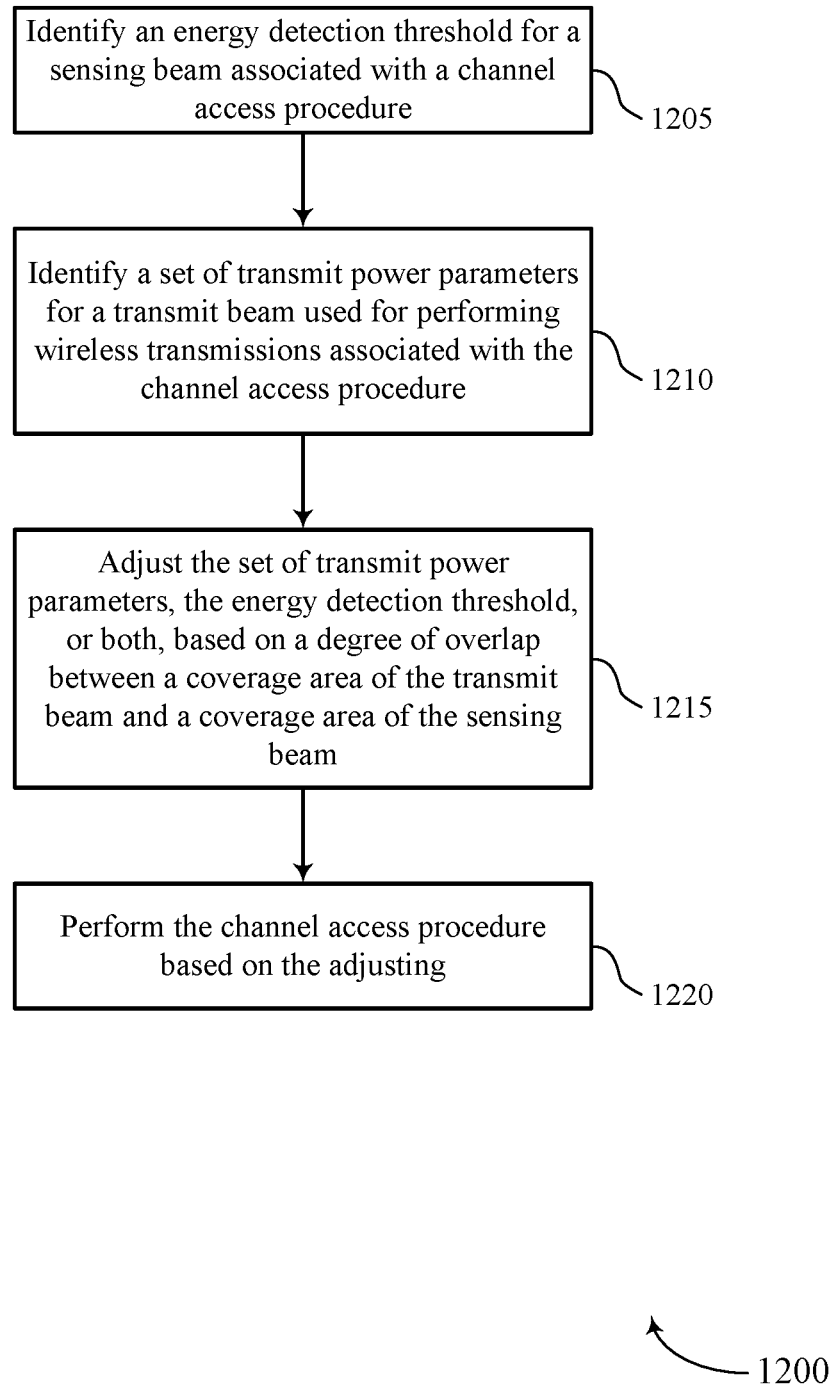
FIGS. 12 through 18 show flowcharts illustrating methods that support listen-before-talk procedures in accordance with aspects of the present disclosure.

FIG. 12 shows a flowchart illustrating a method 1200 that supports listen-before-talk procedures in accordance with aspects of the present disclosure. The operations of method 1200 may be implemented by a UE 115 or base station 105 or its components as described herein. For example, the operations of method 1200 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may identify an energy detection threshold for a sensing beam associated with a channel access procedure. The operations of 1205 may be performed according to the methods described herein. In some examples, aspects of the operations of 1205 may be performed by a sensing identifier as described with reference to FIGS. 7 through 11.

At 1210, the UE or base station may identify a set of transmit power parameters for a transmit beam used for performing wireless transmissions associated with the channel access procedure. The operations of 1210 may be performed according to the methods described herein. In some examples, aspects of the operations of 1210 may be performed by a transmission identifier as described with reference to FIGS. 7 through 11.

At 1215, the UE or base station may adjust the set of transmit power parameters, the energy detection threshold, or both, based on a degree of overlap between a coverage area of the transmit beam and a coverage area of the sensing beam. The operations of 1215 may be performed according to the methods described herein. In some examples, aspects of the operations of 1215 may be performed by an adjustment manager as described with reference to FIGS. 7 through 11.

At 1220, the UE or base station may perform the channel access procedure based on the adjusting. The operations of 1220 may be performed according to the methods described herein. In some examples, aspects of the operations of 1220 may be performed by an LBT component as described with reference to FIGS. 7 through 11.

Figure 13:
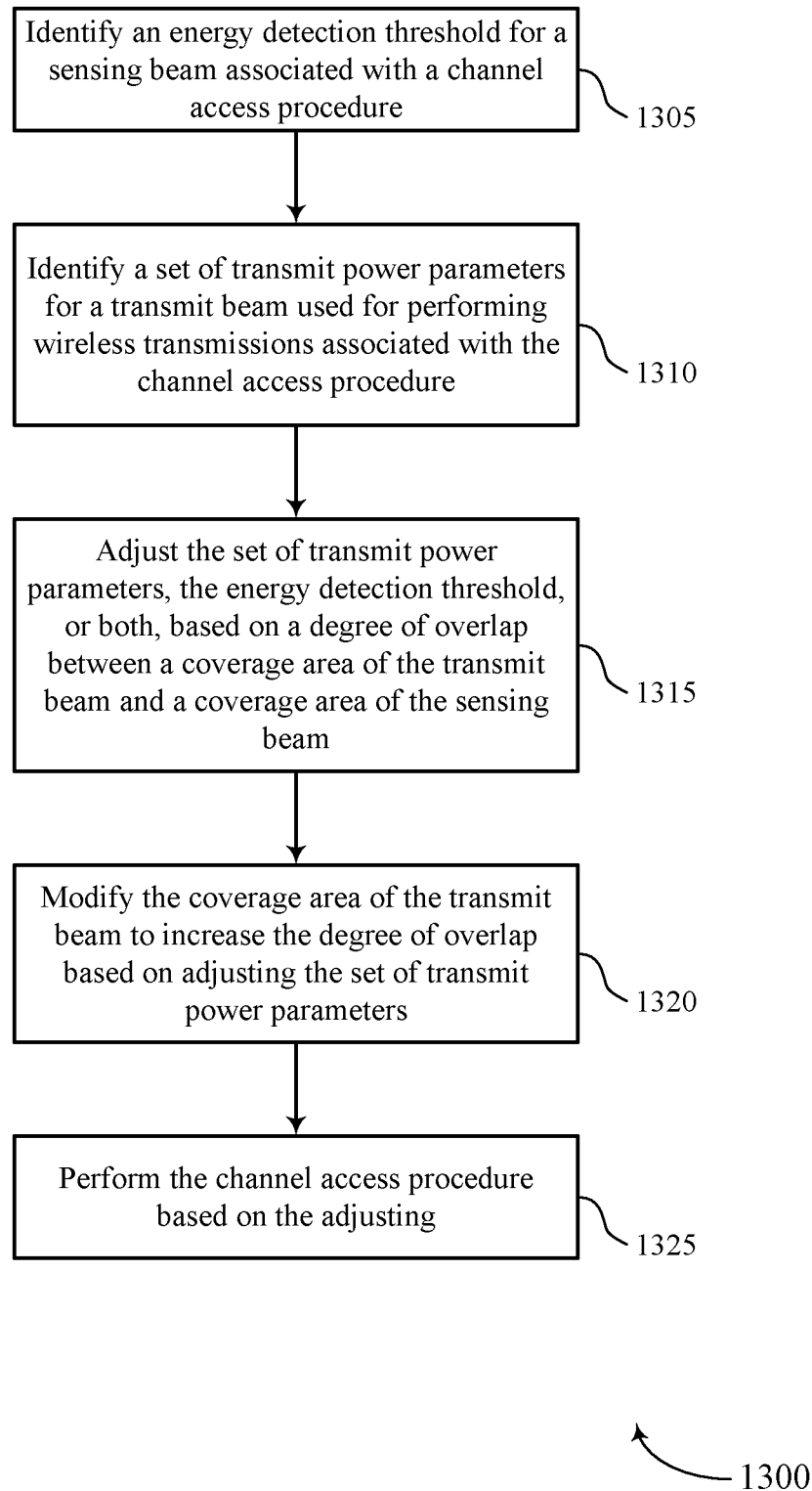

FIG. 13 shows a flowchart illustrating a method 1300 that supports channel access procedures in accordance with aspects of the present disclosure. The operations of method 1300 may be implemented by a UE 115 or base station 105 or its components as described herein. For example, the operations of method 1300 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may identify an energy detection threshold for a sensing beam associated with a channel access procedure. The operations of 1305 may be performed according to the methods described herein. In some examples, aspects of the operations of 1305 may be performed by a sensing identifier as described with reference to FIGS. 7 through 11.

At 1310, the UE or base station may identify a set of transmit power parameters for a transmit beam used for performing wireless transmissions associated with the listen-before-talk procedure. The operations of 1310 may be performed according to the methods described herein. In some examples, aspects of the operations of 1310 may be performed by a transmission identifier as described with reference to FIGS. 7 through 11.

At 1315, the UE or base station may adjust the set of transmit power parameters, the energy detection threshold, or both, based on a degree of overlap between a coverage area of the transmit beam and a coverage area of the sensing beam. The operations of 1315 may be performed according to the methods described herein. In some examples, aspects of the operations of 1315 may be performed by an adjustment manager as described with reference to FIGS. 7 through 11.

At 1320, the UE or base station may modify the coverage area of the transmit beam to increase the degree of overlap based on adjusting the set of transmit power parameters. The operations of 1320 may be performed according to the methods described herein. In some examples, aspects of the operations of 1320 may be performed by a transmission modifier as described with reference to FIGS. 7 through 11.

At 1325, the UE or base station may perform the channel access procedure based on the adjusting. The operations of 1325 may be performed according to the methods described herein. In some examples, aspects of the operations of 1325 may be performed by an LBT component as described with reference to FIGS. 7 through 11.

Figure 14:
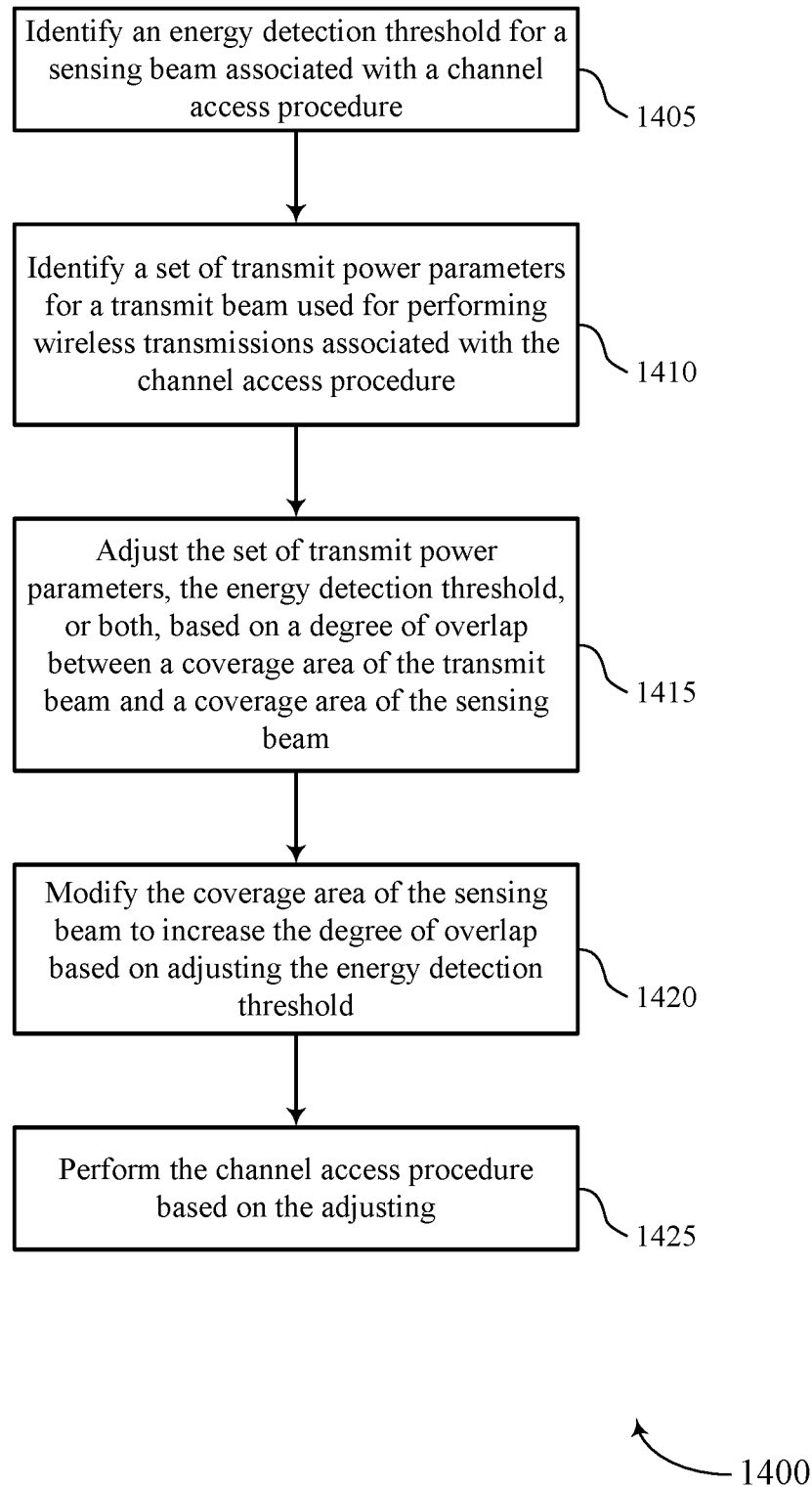

FIG. 14 shows a flowchart illustrating a method 1400 that supports channel access procedures in accordance with aspects of the present disclosure. The operations of method 1400 may be implemented by a UE 115 or base station 105 or its components as described herein. For example, the operations of method 1400 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may identify an energy detection threshold for a sensing beam associated with a channel access procedure. The operations of 1405 may be performed according to the methods described herein. In some examples, aspects of the operations of 1405 may be performed by a sensing identifier as described with reference to FIGS. 7 through 11.

At 1410, the UE or base station may identify a set of transmit power parameters for a transmit beam used for performing wireless transmissions associated with the channel access procedure. The operations of 1410 may be performed according to the methods described herein. In some examples, aspects of the operations of 1410 may be performed by a transmission identifier as described with reference to FIGS. 7 through 11.

At 1415, the UE or base station may adjust the set of transmit power parameters, the energy detection threshold, or both, based on a degree of overlap between a coverage area of the transmit beam and a coverage area of the sensing beam. The operations of 1415 may be performed according to the methods described herein. In some examples, aspects of the operations of 1415 may be performed by an adjustment manager as described with reference to FIGS. 7 through 11.

At 1420, the UE or base station may modify the coverage area of the sensing beam to increase the degree of overlap based on adjusting the energy detection threshold. The operations of 1420 may be performed according to the methods described herein. In some examples, aspects of the operations of 1420 may be performed by a sensing modifier as described with reference to FIGS. 7 through 11.

At 1425, the UE or base station may perform the channel access procedure based on the adjusting. The operations of 1425 may be performed according to the methods described herein. In some examples, aspects of the operations of 1425 may be performed by an LBT component as described with reference to FIGS. 7 through 11.

Figure 15:
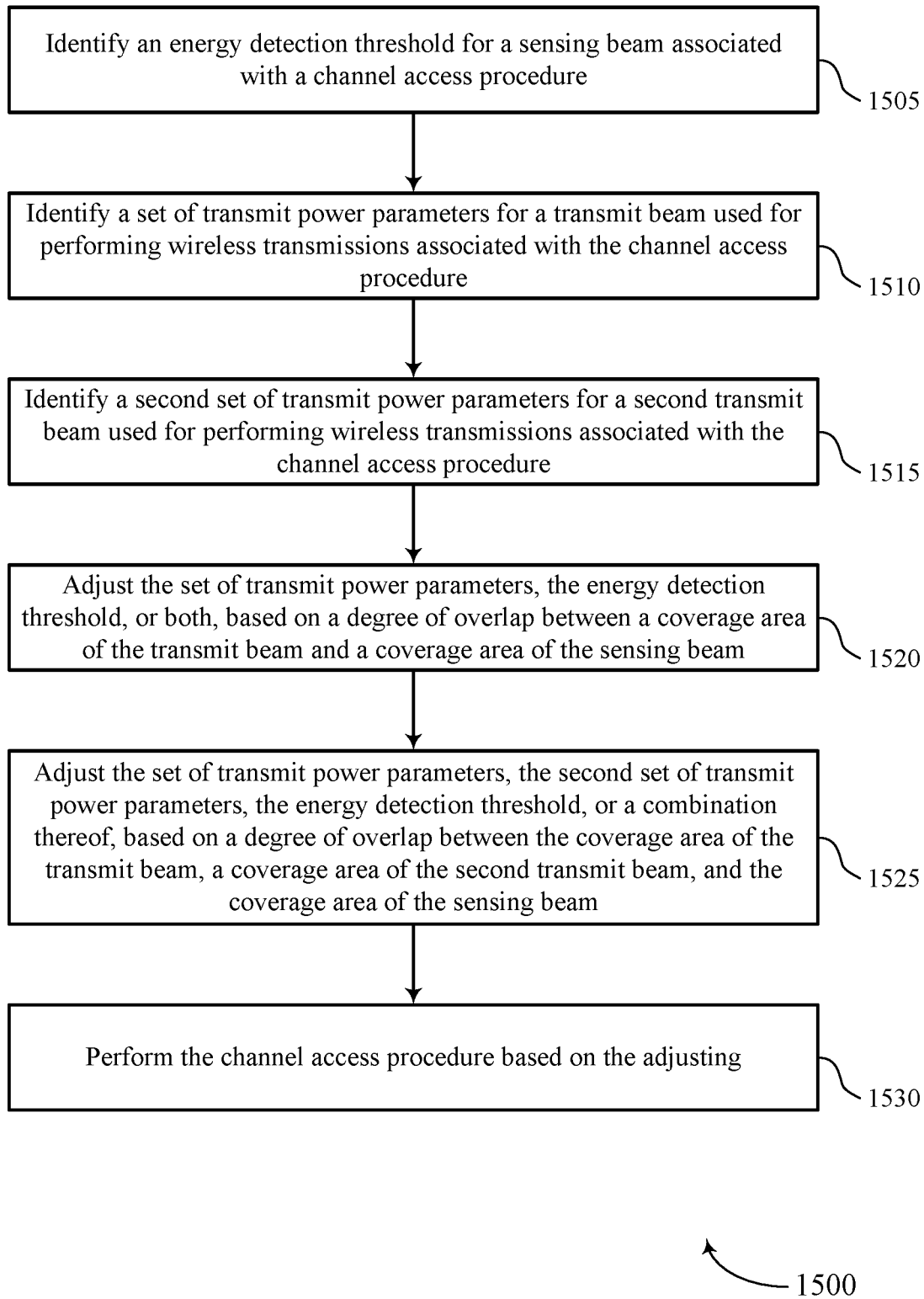

FIG. 15 shows a flowchart illustrating a method 1500 that supports channel access procedures in accordance with aspects of the present disclosure. The operations of method 1500 may be implemented by a UE 115 or base station 105 or its components as described herein. For example, the operations of method 1500 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may identify an energy detection threshold for a sensing beam associated with a channel access procedure. The operations of 1505 may be performed according to the methods described herein. In some examples, aspects of the operations of 1505 may be performed by a sensing identifier as described with reference to FIGS. 7 through 11.

At 1510, the UE or base station may identify a set of transmit power parameters for a transmit beam used for performing wireless transmissions associated with the channel access procedure. The operations of 1510 may be performed according to the methods described herein. In some examples, aspects of the operations of 1510 may be performed by a transmission identifier as described with reference to FIGS. 7 through 11.

At 1515, the UE or base station may identify a second set of transmit power parameters for a second transmit beam used for performing wireless transmissions associated with the channel access procedure. The operations of 1515 may be performed according to the methods described herein. In some examples, aspects of the operations of 1515 may be performed by a transmission identifier as described with reference to FIGS. 7 through 11.

At 1520, the UE or base station may adjust the set of transmit power parameters, the energy detection threshold, or both, based on a degree of overlap between a coverage area of the transmit beam and a coverage area of the sensing beam. The operations of 1520 may be performed according to the methods described herein. In some examples, aspects of the operations of 1520 may be performed by an adjustment manager as described with reference to FIGS. 7 through 11.

At 1525, the UE or base station may adjust the set of transmit power parameters, the second set of transmit power parameters, the energy detection threshold, or a combination thereof, based on a degree of overlap between the coverage area of the transmit beam, a coverage area of the second transmit beam, and the coverage area of the sensing beam. The operations of 1525 may be performed according to the methods described herein. In some examples, aspects of the operations of 1525 may be performed by an adjustment manager as described with reference to FIGS. 7 through 11.

At 1530, the UE or base station may perform the channel access procedure based on the adjusting. The operations of 1530 may be performed according to the methods described herein. In some examples, aspects of the operations of 1530 may be performed by an LBT component as described with reference to FIGS. 7 through 11.

Figure 16:
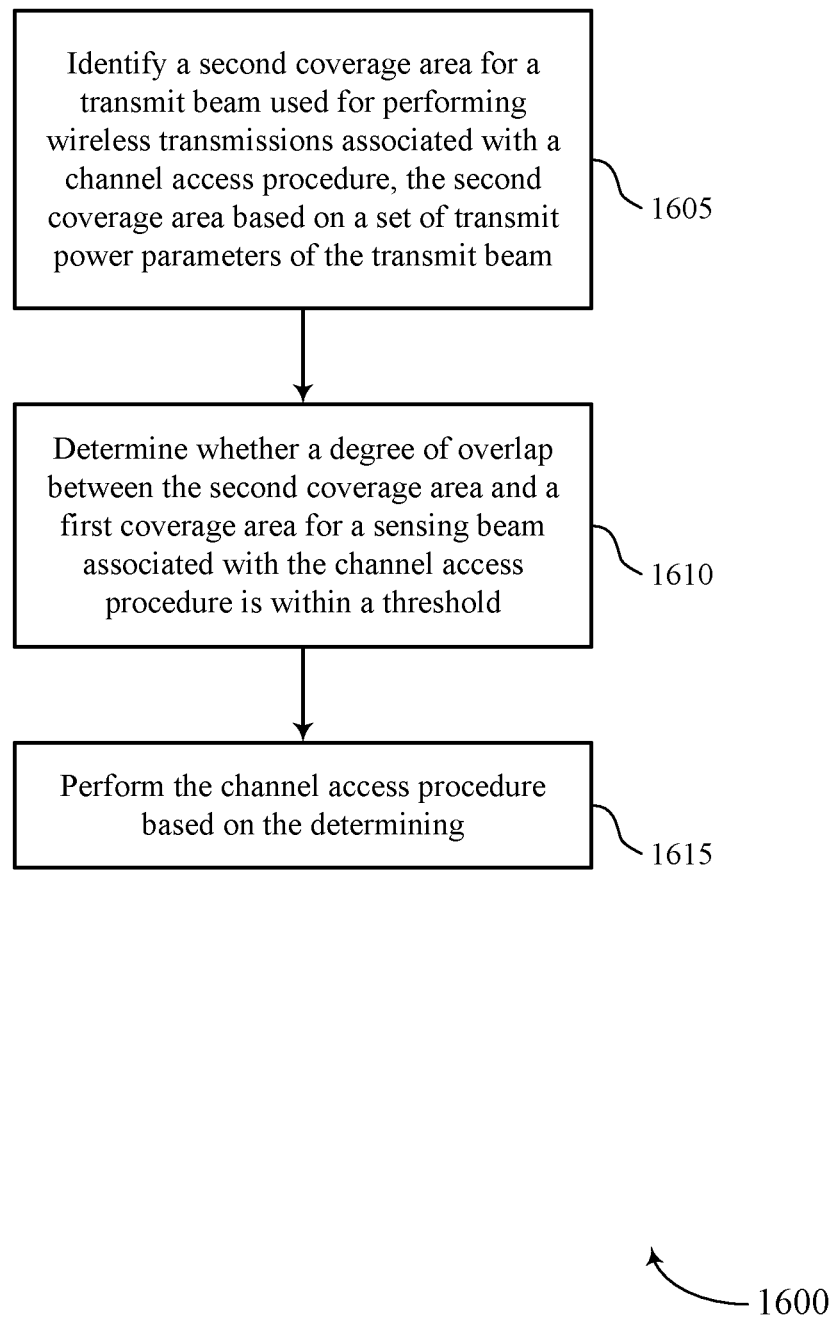

FIG. 16 shows a flowchart illustrating a method 1600 that supports channel access procedures in accordance with aspects of the present disclosure. The operations of method 1600 may be implemented by a UE 115 or base station 105 or its components as described herein. For example, the operations of method 1600 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may identify a second coverage area for a transmit beam used for performing wireless transmissions associated with a channel access procedure, the second coverage area based on a set of transmit power parameters of the transmit beam. The operations of 1605 may be performed according to the methods described herein. In some examples, aspects of the operations of 1605 may be performed by a transmission coverage identifier as described with reference to FIGS. 7 through 11.

At 1610, the UE or base station may determine whether a degree of overlap between the second coverage area and a first coverage area for a sensing beam associated with the channel access procedure is within a threshold. The operations of 1610 may be performed according to the methods described herein. In some examples, aspects of the operations of 1610 may be performed by an overlap module as described with reference to FIGS. 7 through 11.

At 1615, the UE or base station may perform the channel access procedure based on the determining. The operations of 1615 may be performed according to the methods described herein. In some examples, aspects of the operations of 1615 may be performed by an LBT manager as described with reference to FIGS. 7 through 11.

Figure 17:
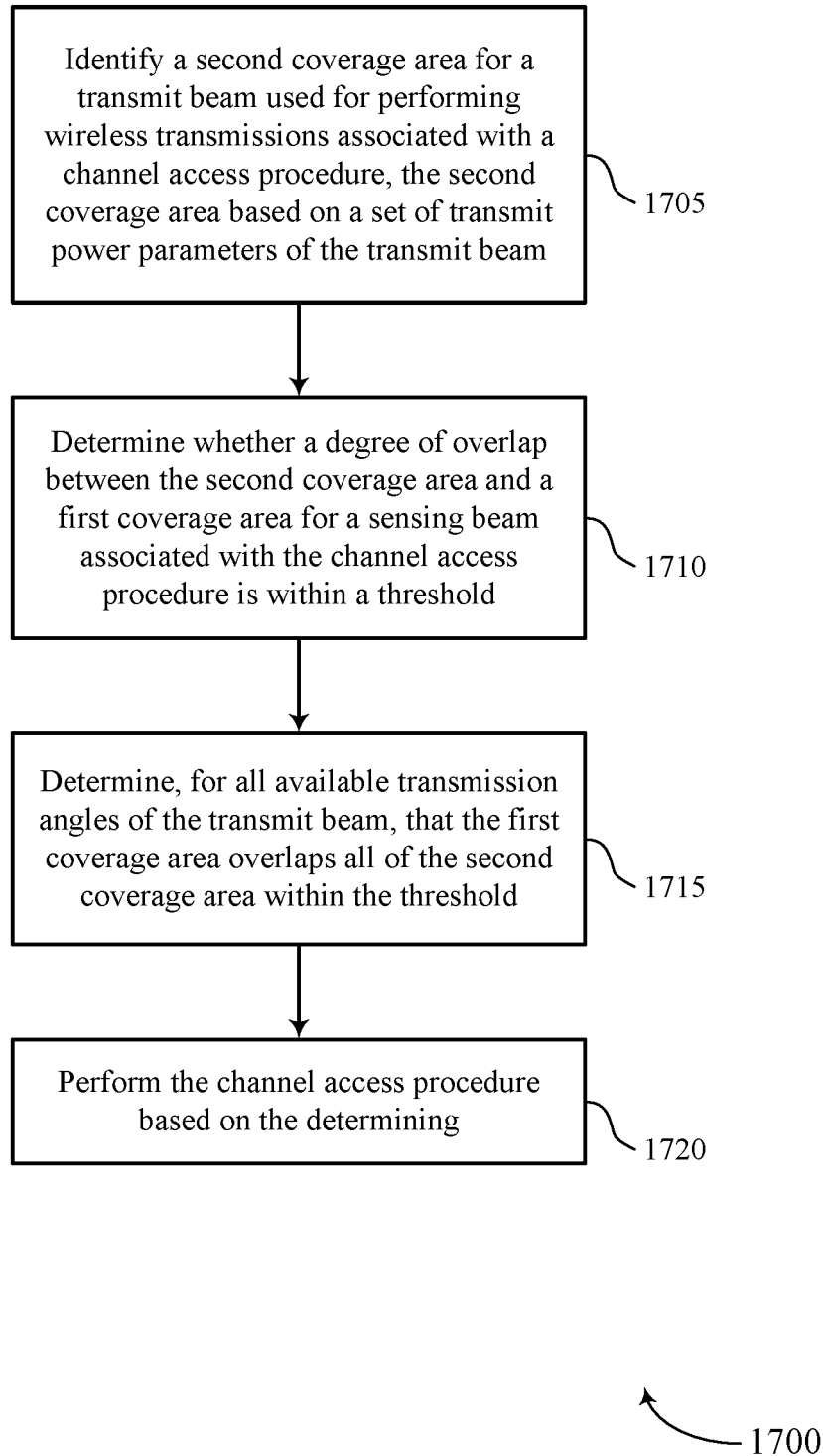

FIG. 17 shows a flowchart illustrating a method 1700 that supports channel access procedures in accordance with aspects of the present disclosure. The operations of method 1700 may be implemented by a UE 115 or base station 105 or its components as described herein. For example, the operations of method 1700 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1705, the UE or base station may identify a second coverage area for a transmit beam used for performing wireless transmissions associated with a listen-before-talk procedure, the second coverage area based on a set of transmit power parameters of the transmit beam. The operations of 1705 may be performed according to the methods described herein. In some examples, aspects of the operations of 1705 may be performed by a transmission identifier as described with reference to FIGS. 7 through 11.

At 1710, the UE or base station may determine whether a degree of overlap between the second coverage area and a first coverage area for a sensing beam associated with the channel access procedure is within a threshold. The operations of 1710 may be performed according to the methods described herein. In some examples, aspects of the operations of 1710 may be performed by an overlap module as described with reference to FIGS. 7 through 11.

At 1715, the UE or base station may determine, for all available transmission angles of the transmit beam, that the first coverage area overlaps all of the second coverage area within the threshold. The operations of 1715 may be performed according to the methods described herein. In some examples, aspects of the operations of 1715 may be performed by an overlap module as described with reference to FIGS. 7 through 11.

At 1720, the UE or base station may perform the channel access procedure based on the determining. The operations of 1720 may be performed according to the methods described herein. In some examples, aspects of the operations of 1720 may be performed by an LBT manager as described with reference to FIGS. 7 through 11.

Figure 18:
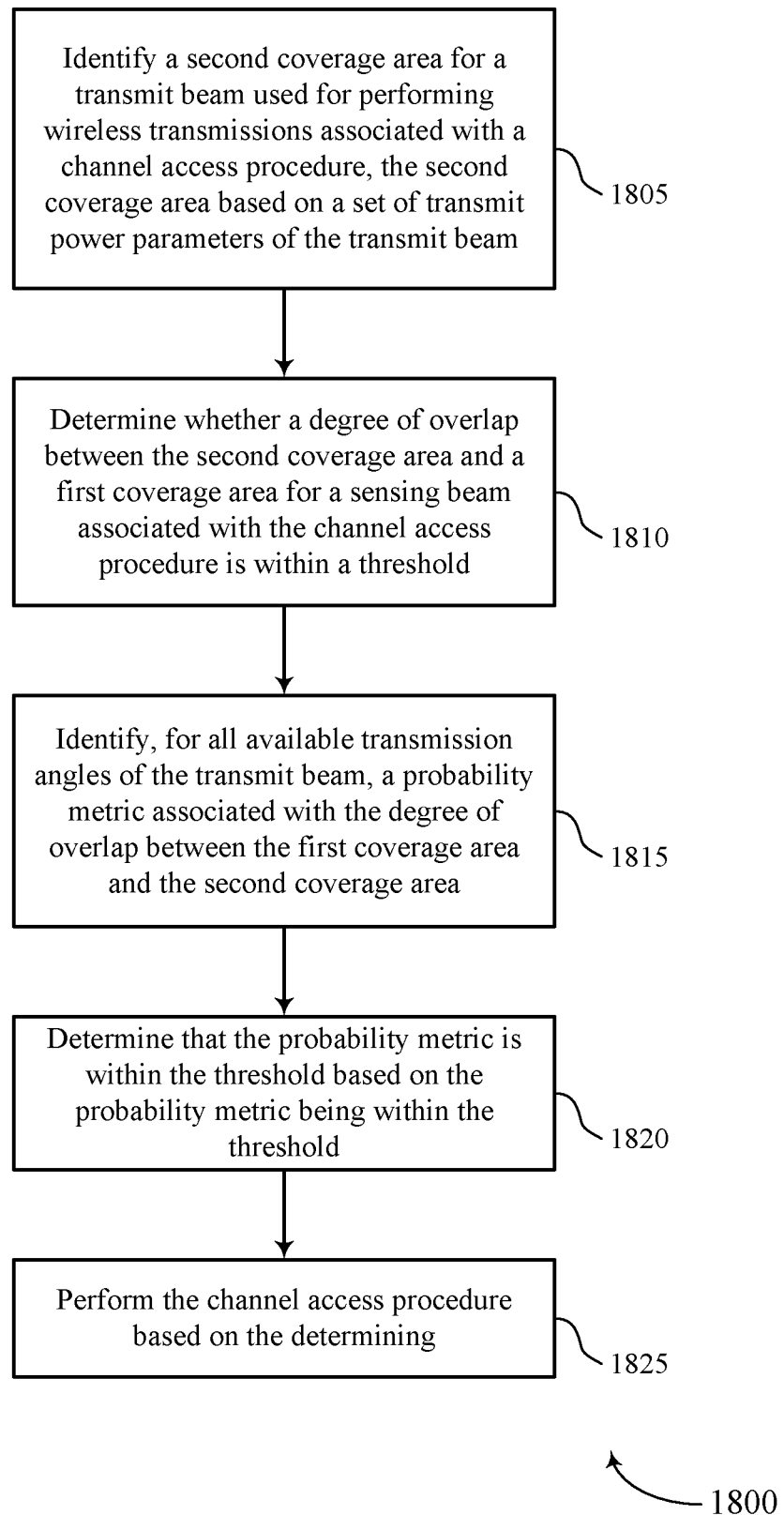

FIG. 18 shows a flowchart illustrating a method 1800 that supports channel access procedures in accordance with aspects of the present disclosure. The operations of method 1800 may be implemented by a UE 115 or base station 105 or its components as described herein. For example, the operations of method 1800 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1805, the UE or base station may identify a second coverage area for a transmit beam used for performing wireless transmissions associated with a channel access procedure, the second coverage area based on a set of transmit power parameters of the transmit beam. The operations of 1805 may be performed according to the methods described herein. In some examples, aspects of the operations of 1805 may be performed by a transmission coverage identifier as described with reference to FIGS. 7 through 11.

At 1810, the UE or base station may determine whether a degree of overlap between the second coverage area and a first coverage area for a sensing beam associated with the channel access procedure is within a threshold. The operations of 1810 may be performed according to the methods described herein. In some examples, aspects of the operations of 1810 may be performed by an overlap module as described with reference to FIGS. 7 through 11.

At 1815, the UE or base station may identify, for all available transmission angles of the transmit beam, a probability metric associated with the degree of overlap between the first coverage area and the second coverage area. The operations of 1815 may be performed according to the methods described herein. In some examples, aspects of the operations of 1815 may be performed by an overlap module as described with reference to FIGS. 7 through 11.

At 1820, the UE or base station may determine that the probability metric is within the threshold based on the probability metric being within the threshold. The operations of 1820 may be performed according to the methods described herein. In some examples, aspects of the operations of 1820 may be performed by an overlap module as described with reference to FIGS. 7 through 11.

At 1825, the UE or base station may perform the channel access procedure based on the determining. The operations of 1825 may be performed according to the methods described herein. In some examples, aspects of the operations of 1825 may be performed by an LBT manager as described with reference to FIGS. 7 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), TDMA, frequency division multiple access (FDMA), orthogonal FMDA (OFDMA), single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
   identifying a second coverage area for a transmit beam used for performing wireless transmissions associated with a channel access procedure, the second coverage area based at least in part on a set of transmit power parameters of the transmit beam;
   determining whether a degree of overlap between the second coverage area and a first coverage area for a sensing beam associated with the channel access procedure is within a threshold based at least in part on a set of transmission angles of the transmit beam and a set of channel sensing parameters associated with the sensing beam, wherein determining whether the degree of overlap is within the threshold comprises:
      identifying a maximum transmission power for the set of transmission angles of the transmit beam;
      identifying a subset of transmission angles for the transmit beam, each transmission angle in the subset of transmission angles comprising a transmission power within a threshold value of a maximum transmission angle; and
      determining that a respective coverage area of the transmit beam corresponding to each transmission angle in the subset of transmission angles is within the threshold; and
   performing the channel access procedure based at least in part on the determining whether the degree of overlap is within the threshold.

2. The method of claim 1, wherein determining whether the degree of overlap is within the threshold comprises:
   determining, for all available transmission angles of the transmit beam, that the first coverage area overlaps all of the second coverage area within the threshold.

3. The method of claim 1, wherein determining whether the degree of overlap is within the threshold comprises:
   identifying, for all available transmission angles of the transmit beam, a probability metric associated with the degree of overlap between the first coverage area and the second coverage area; and
   determining that the probability metric is within the threshold based at least in part on the probability metric being within the threshold.

4. The method of claim 1, further comprising:
   identifying the first coverage area for the sensing beam based at least in part on an energy detection threshold associated with the channel access procedure.

5. The method of claim 1, wherein determining whether the degree of overlap is within the threshold comprises:
   calculating, for each transmission angle within the set of transmission angles of the transmit beam, a difference in gain between the transmit beam and the sensing beam; and identifying a second subset of transmission angles for the transmit beam in which the difference in gain is within the threshold.

6. The method of claim 1, wherein the sensing beam comprises a directional sensing beam.

7. The method of claim 1, wherein the set of transmit power parameters comprises a transmission power of the transmit beam, an effective isotropic radiated power (EIRP) of the transmit beam, or a combination thereof.

8. The method of claim 1, wherein the wireless device is a user equipment (UE), a network device, or a relay node.

9. The method of claim 1, wherein the transmit beam comprises a signal synchronization block (SSB), a control channel, a data channel, a reference signal, a beam of a beam sweeping procedure, or any combination thereof.

10. The method of claim 1, wherein the wireless device comprises a plurality of antenna elements, each antenna element of the plurality of antenna elements configured to perform the channel access procedure.

11. An apparatus for wireless communication at a wireless device, comprising:
a processor,
memory coupled with the processor; and
instructions stored in the memory and executable by the processor to cause the apparatus to:
identify a second coverage area for a transmit beam used for performing wireless transmissions associated with a channel access procedure, the second coverage area based at least in part on a set of transmit power parameters of the transmit beam;
determine whether a degree of overlap between the second coverage area and a first coverage area for a sensing beam associated with the channel access procedure is within a threshold based at least in part on a set of transmission angles of the transmit beam and a set of channel sensing parameters associated with the sensing beam, wherein the instructions to determine whether the degree of overlap is within the threshold are executable by the processor to cause the apparatus to:
identify a maximum transmission power for the set of transmission angles of the transmit beam;
identify a subset of transmission angles for the transmit beam, each transmission angle in the subset of transmission angles comprising a transmission power within a threshold value of a maximum transmission angle; and
determine that a respective coverage area of the transmit beam corresponding to each transmission angle in the subset of transmission angles is within the threshold; and
perform the channel access procedure based at least in part on the determining whether the degree of overlap is within the threshold.

12. The apparatus of claim 11, wherein the instructions to determine whether the degree of overlap is within the threshold are executable by the processor to cause the apparatus to:
determine, for all available transmission angles of the transmit beam, that the first coverage area overlaps all of the second coverage area within the threshold.

13. The apparatus of claim 11, wherein the instructions to determine whether the degree of overlap is within the threshold are executable by the processor to cause the apparatus to:
identify, for all available transmission angles of the transmit beam, a probability metric associated with the degree of overlap between the first coverage area and the second coverage area; and
determine that the probability metric is within the threshold based at least in part on the probability metric being within the threshold.

14. The apparatus of claim 11, wherein the instructions are further executable by the processor to cause the apparatus to:
identify the first coverage area for the sensing beam based at least in part on an energy detection threshold associated with a listen before talk procedure.

15. The apparatus of claim 11, wherein the instructions to determine whether the degree of overlap is within the threshold are executable by the processor to cause the apparatus to:
calculate, for each transmission angle within the set of transmission angles of the transmit beam, a difference in gain between the transmit beam and the sensing beam; and
identify a second subset of transmission angles for the transmit beam in which the difference in gain is within the threshold.

16. The apparatus of claim 11, wherein the sensing beam comprises a directional sensing beam.

17. The apparatus of claim 11, wherein the set of transmit power parameters comprises a transmission power of the transmit beam, an effective isotropic radiated power (EIRP) of the transmit beam, or a combination thereof.

18. The apparatus of claim 11, wherein the wireless device is a user equipment (UE), a network device, or a relay node.

19. The apparatus of claim 11, wherein the transmit beam comprises a signal synchronization block (SSB), a control channel, a data channel, a reference signal, a beam of a beam sweeping procedure, or any combination thereof.

20. The apparatus of claim 11, wherein the wireless device comprises a plurality of antenna elements, each antenna element of the plurality of antenna elements configured to perform the channel access procedure.

21. An apparatus for wireless communication at a wireless device, comprising:
means for identifying a second coverage area for a transmit beam used for performing wireless transmissions associated with a channel access procedure, the second coverage area based at least in part on a set of transmit power parameters of the transmit beam;
means for determining whether a degree of overlap between the second coverage area and a first coverage area for a sensing beam associated with the channel access procedure is within a threshold based at least in part on a set of transmission angles of the transmit beam and a set of channel sensing parameters associated with the sensing beam, wherein the means for determining whether the degree of overlap is within the threshold comprises:
means for identifying a maximum transmission power for the set of transmission angles of the transmit beam;
means for identifying a subset of transmission angles for the transmit beam, each transmission angle in the subset of transmission angles comprising a transmission power within a threshold value of a maximum transmission angle; and
means for determining that a respective coverage area of the transmit beam corresponding to each transmission angle in the subset of transmission angles is within the threshold; and means for performing the channel access procedure based at least in part on the determining whether the degree of overlap is within the threshold.

22. The apparatus of claim 21, wherein the means for determining whether the degree of overlap is within the threshold comprises:
means for determining, for all available transmission angles of the transmit beam, that the first coverage area overlaps all of the second coverage area within the threshold.

23. The apparatus of claim 21, wherein the means for determining whether the degree of overlap is within the threshold comprises:
means for identifying, for all available transmission angles of the transmit beam, a probability metric associated with the degree of overlap between the first coverage area and the second coverage area; and
means for determining that the probability metric is within the threshold based at least in part on the probability metric being within the threshold.

24. The apparatus of claim 21, further comprising:
means for identifying the first coverage area for the sensing beam based at least in part on an energy detection threshold associated with the channel access procedure.

25. A non-transitory computer-readable medium storing code for wireless communication at a wireless device, the code comprising instructions executable by a processor to:
identify a second coverage area for a transmit beam used for performing wireless transmissions associated with a channel access procedure, the second coverage area based at least in part on a set of transmit power parameters of the transmit beam;
determine whether a degree of overlap between the second coverage area and a first coverage area for a sensing beam associated with the channel access procedure is within a threshold based at least in part on a set of transmission angles of the transmit beam and a set of channel sensing parameters associated with the sensing beam, wherein the instructions to determine whether the degree of overlap is within the threshold are executable to:
identify a maximum transmission power for the set of transmission angles of the transmit beam;
identify a subset of transmission angles for the transmit beam, each transmission angle in the subset of transmission angles comprising a transmission power within a threshold value of a maximum transmission angle; and
determine that a respective coverage area of the transmit beam corresponding to each transmission angle in the subset of transmission angles is within the threshold; and
perform the channel access procedure based at least in part on the determining whether the degree of overlap is within the threshold.

26. The non-transitory computer-readable medium of claim 25, wherein the instructions to determine whether the degree of overlap is within the threshold are executable to:
determine, for all available transmission angles of the transmit beam, that the first coverage area overlaps all of the second coverage area within the threshold.

27. The non-transitory computer-readable medium of claim 25, wherein the instructions to determine whether the degree of overlap is within the threshold are executable to:
identify, for all available transmission angles of the transmit beam, a probability metric associated with the degree of overlap between the first coverage area and the second coverage area; and
determine that the probability metric is within the threshold based at least in part on the probability metric being within the threshold.

28. The non-transitory computer-readable medium of claim 25, wherein the instructions are further executable to:
identify the first coverage area for the sensing beam based at least in part on an energy detection threshold associated with the channel access procedure.

* * * * *